US008508917B2

(12) United States Patent
Rus et al.

(10) Patent No.: US 8,508,917 B2
(45) Date of Patent: Aug. 13, 2013

(54) SEALED CIRCUIT BREAKER

(75) Inventors: Vilian Rus, Amiens (FR); Yogesh Kanole, Pune (IN); Vijay Nadgeri, Maharashtra (IN)

(73) Assignee: EGS Electrical Group, LLC, Rosemount, IL (US)

( * ) Notice: Subject to any disclaimer, the term of this patent is extended or adjusted under 35 U.S.C. 154(b) by 213 days.

(21) Appl. No.: 13/071,242

(22) Filed: Mar. 24, 2011

(65) Prior Publication Data

US 2011/0235243 A1 Sep. 29, 2011

Related U.S. Application Data

(63) Continuation of application No. PCT/US2010/036442, filed on May 27, 2010.

(30) Foreign Application Priority Data

Mar. 26, 2010 (IN) ........................... 864/MUM/2010

(51) Int. Cl.
*H02B 1/26* (2006.01)

(52) U.S. Cl.
USPC ........... 361/624; 361/605; 361/608; 361/641; 361/643; 174/50.51; 174/50.54; 174/67; 174/541; 220/3.8; 220/560.01

(58) Field of Classification Search
USPC .................... 361/679.01, 600, 605, 611, 612, 361/613, 624, 627, 629, 634, 641, 643, 652, 361/656, 657, 800–802; 174/50, 50.5, 50.51–50.54, 17 VA, 541, 174/561, 67; D13/162, 184; 312/223.2, 312/223.3; 200/50, 293, 296, 297
See application file for complete search history.

(56) References Cited

U.S. PATENT DOCUMENTS 2,786,936 A 3/1957 Appleton
3,348,103 A * 10/1967 Berry ............................ 361/652

(Continued)

FOREIGN PATENT DOCUMENTS

CA 2373527 A1 6/2002
DE 8805069 8/1988

(Continued)

OTHER PUBLICATIONS

A.T.X. Catalog "Electrical Equipment for Hazardous Areas," pp. 42, 144, 146, 152, 153, 162-167 (1998).

(Continued)

*Primary Examiner* — Michail V Datskovskiy
(74) *Attorney, Agent, or Firm* — McDonnell Boehnen Hulbert & Berghoff

(57) ABSTRACT

A sealed electrical enclosure for use in hazardous locations for enclosing circuit breakers having a bottom housing and a top housing with a labyrinth joint, a serrated joint, or combination of both being formed therebetween, a first aperture extending through a first end wall of the bottom housing and positioned adjacent a first contact terminal of a first circuit breaker, the first aperture further including a first metal bus extending therethrough and in electrical contact with the first contact terminal, and a second aperture extending through a second end wall of the bottom housing and positioned adjacent a second contact terminal of the first circuit breaker, the second aperture further including a second metal bus extending therethrough and in electrical contact with the second contact terminal, and a first actuating mechanism positioned on the top housing adapted for manipulating a switch of the first circuit breaker.

29 Claims, 21 Drawing Sheets

(56) References Cited

U.S. PATENT DOCUMENTS

| | | | | | |
|---|---|---|---|---|---|
| 3,675,007 | A | | 7/1972 | Appleton et al. | |
| 3,986,081 | A | | 10/1976 | Norden | |
| 4,034,170 | A | | 7/1977 | Raabe et al. | |
| 4,156,121 | A | | 5/1979 | Klein et al. | |
| 4,180,177 | A | | 12/1979 | Gunderman et al. | |
| 4,260,863 | A | | 4/1981 | Appleton | |
| 4,620,061 | A | | 10/1986 | Appleton | |
| 4,664,281 | A | * | 5/1987 | Falk et al. | 220/3.8 |
| 4,717,987 | A | | 1/1988 | Newark et al. | |
| 4,783,718 | A | | 11/1988 | Raabe et al. | |
| 4,894,632 | A | | 1/1990 | Castonguay et al. | |
| 4,913,503 | A | | 4/1990 | Castonguay et al. | |
| 4,914,262 | A | | 4/1990 | Appleton | |
| 4,965,414 | A | | 10/1990 | Sobotka et al. | |
| 4,965,544 | A | | 10/1990 | Kelaita, Jr. et al. | |
| 4,978,816 | A | | 12/1990 | Castonguay et al. | |
| 5,070,361 | A | | 12/1991 | Magnon et al. | |
| 5,151,564 | A | | 9/1992 | Rowe | |
| 5,157,577 | A | * | 10/1992 | Balaud et al. | 361/724 |
| 5,202,538 | A | | 4/1993 | Skirpan | |
| 5,260,531 | A | | 11/1993 | Yarbrough et al. | |
| 5,272,296 | A | | 12/1993 | Robarge et al. | |
| 5,286,935 | A | | 2/1994 | Mina et al. | |
| 5,334,939 | A | | 8/1994 | Yarbrough | |
| 5,351,165 | A | | 9/1994 | Hancock | |
| 5,362,933 | A | * | 11/1994 | Kutsche et al. | 200/401 |
| 5,410,446 | A | | 4/1995 | Wright et al. | |
| 5,414,584 | A | | 5/1995 | Young | |
| 5,457,296 | A | | 10/1995 | Neill et al. | |
| 5,597,991 | A | | 1/1997 | Chen et al. | |
| 5,607,047 | A | | 3/1997 | Leet et al. | |
| 5,634,553 | A | | 6/1997 | Hopper et al. | |
| 5,663,862 | A | | 9/1997 | Hopping-Mills | |
| 5,717,182 | A | | 2/1998 | Mina et al. | |
| 5,721,667 | A | | 2/1998 | Rose | |
| 5,753,878 | A | | 5/1998 | Doughty et al. | |
| 5,761,046 | A | * | 6/1998 | Hein et al. | 361/752 |
| 5,767,440 | A | * | 6/1998 | Byron et al. | 174/17 VA |
| 5,838,219 | A | | 11/1998 | Du et al. | |
| 5,857,563 | A | | 1/1999 | Helmer et al. | |
| 5,870,278 | A | | 2/1999 | Girard et al. | |
| 5,886,868 | A | | 3/1999 | White et al. | |
| 5,894,404 | A | | 4/1999 | Vrnak et al. | |
| 5,902,973 | A | | 5/1999 | Ramey et al. | |
| 5,911,316 | A | | 6/1999 | Chu | |
| 5,936,214 | A | | 8/1999 | Phillips | |
| 5,969,587 | A | | 10/1999 | Combas | |
| 6,040,543 | A | | 3/2000 | Mina et al. | |
| 6,087,609 | A | | 7/2000 | Thilker et al. | |
| 6,100,481 | A | | 8/2000 | Castonguay et al. | |
| 6,229,692 | B1 | | 5/2001 | Stendardo et al. | |
| 6,838,962 | B2 | | 1/2005 | Leone et al. | |
| 6,989,996 | B2 | | 1/2006 | Wells et al. | |
| 7,400,239 | B2 | | 7/2008 | Kiko et al. | |
| 7,907,389 | B2 | | 3/2011 | Baird et al. | |
| 2004/0045796 | A1 | | 3/2004 | Azzola et al. | |
| 2004/0196640 | A1 | | 10/2004 | Wells et al. | |
| 2006/0291148 | A1 | | 12/2006 | Kelly et al. | |
| 2009/0323255 | A1 | * | 12/2009 | Naumann et al. | 361/608 |
| 2010/0033907 | A1 | * | 2/2010 | Baird et al. | 361/624 |
| 2010/0140274 | A1 | * | 6/2010 | Lasarzik et al. | 220/560.01 |

FOREIGN PATENT DOCUMENTS

| | | | | |
|---|---|---|---|---|
| EP | 000508320 | A2 | * | 10/1992 |
| FR | 2622734 | A1 | | 11/1987 |
| JP | 02003178637 | A | * | 6/2003 |

OTHER PUBLICATIONS

Photos 1-5 of a crouse-hinds breaker obtained approx. Jun. 2006.
Legrand A.T.X. Catalogue, pp. 2, 4, 5, 10 (1987-88).
International Application No. PCT/US2010/036442 International Search Report and Written Opinion date Nov. 30, 2010.
Google Translation of DE8805069 Nov. 3, 2011.
"Crouse-Hinds" Catalogue pp. 526-527 (2002).
Notification Concerning Transmittal of International Preliminary Report on Patentability (Chapter I of the Patent Cooperation Treaty) and International Preliminary Report for PCT/US2010/036442 issued Oct. 2, 2012 (6 pages).

* cited by examiner

SEALED CIRCUIT BREAKER

RELATED APPLICATIONS

This application claims priority to Indian Application Serial No. 864/MUM/2010 filed Mar. 26, 2010 and PCT/US10/036,442 filed May 27, 2010 the disclosures of which are hereby incorporated by reference.

BACKGROUND

1. Field of the Application

This application relates to sealed electrical enclosures for use in hazardous locations for a variety of electrical components, such as circuit breakers, motor switches, GFI devices, and photocells.

2. Description of the Related Art

Traditionally, in Europe, in accordance with IEC methodology, each circuit breaker or other electrical device is separately and permanently sealed (often potted in epoxy) to provide a flame proof device. Such circuit breakers are available from Stahl, CEAG, and ATX. Each flame proof sealed circuit breaker or electrical device is then typically placed in a non-metallic or sheet metal enclosure. In the event that a circuit breaker needs to be replaced, the flame proof circuit breaker is removed, and a replacement flame proof circuit breaker installed. A drawback to this methodology is that it is more costly to replace each separately sealed flame proof circuit breakers than it is to replace non-flame proof circuit breakers.

Alternatively, in North America, to use circuit breakers in a hazardous (classified) area, standard circuit breakers are placed in a cast metal housing such as aluminum, wherein the cast metal housing is bolted shut. In such an arrangement, the circuit breaker switches may be manipulated through a cast metal door that is bolted to the cast metal housing. In North America, this construction is suitable for Class I Division 1 and Class I Division 2 applications. A drawback of this arrangement is that the cast iron enclosures are heavy and cumbersome. Furthermore, it can be time consuming and laborious to remove the often extensive number of bolts from the cast metal housing to access the circuit breakers within. Thus, replacing circuit breakers using enclosures with this construction can be time consuming and costly.

There has been an increased demand for sealed breakers in North America and around the world. Thus, there is a need to provide an electrical enclosure for use in hazardous (classified) locations that can provide for the removal and replacement of circuit breakers or other electrical components from a reusable electrical enclosure.

SUMMARY

The present application provides a sealed electrical enclosure for use in hazardous locations for enclosing circuit breakers or other electrical components comprising: a bottom housing having a first end wall and a second end wall, a top housing positioned above the bottom housing, a labyrinth joint or serrated joint or combination of both being formed between the bottom housing and the top housing, a first aperture extending through the first end wall and positioned adjacent a first contact terminal of a first circuit breaker when the first circuit breaker is positioned within the bottom housing, the first aperture further including a first metal bus extending through the first aperture and in electrical contact with the first contact terminal and also extending to a point external to the bottom housing, and a second aperture extending through the second end wall and positioned adjacent a second contact terminal of the first circuit breaker when the first circuit breaker is positioned within the bottom housing, the second aperture further including a second metal bus extending through the second aperture and in electrical contact with the second contact terminal and also extending to a point external to the bottom housing, and a first actuating mechanism positioned on the top housing adapted for manipulating a switch of the first circuit breaker, and wherein the top housing is removably secured to the bottom housing to allow for removal and replacement of the first circuit breaker or the first electrical component within the housing.

BRIEF DESCRIPTION OF THE DRAWINGS

Exemplary embodiments of the invention are described herein with reference to the drawings, in which.

DETAILED DESCRIPTION

Figure 1:
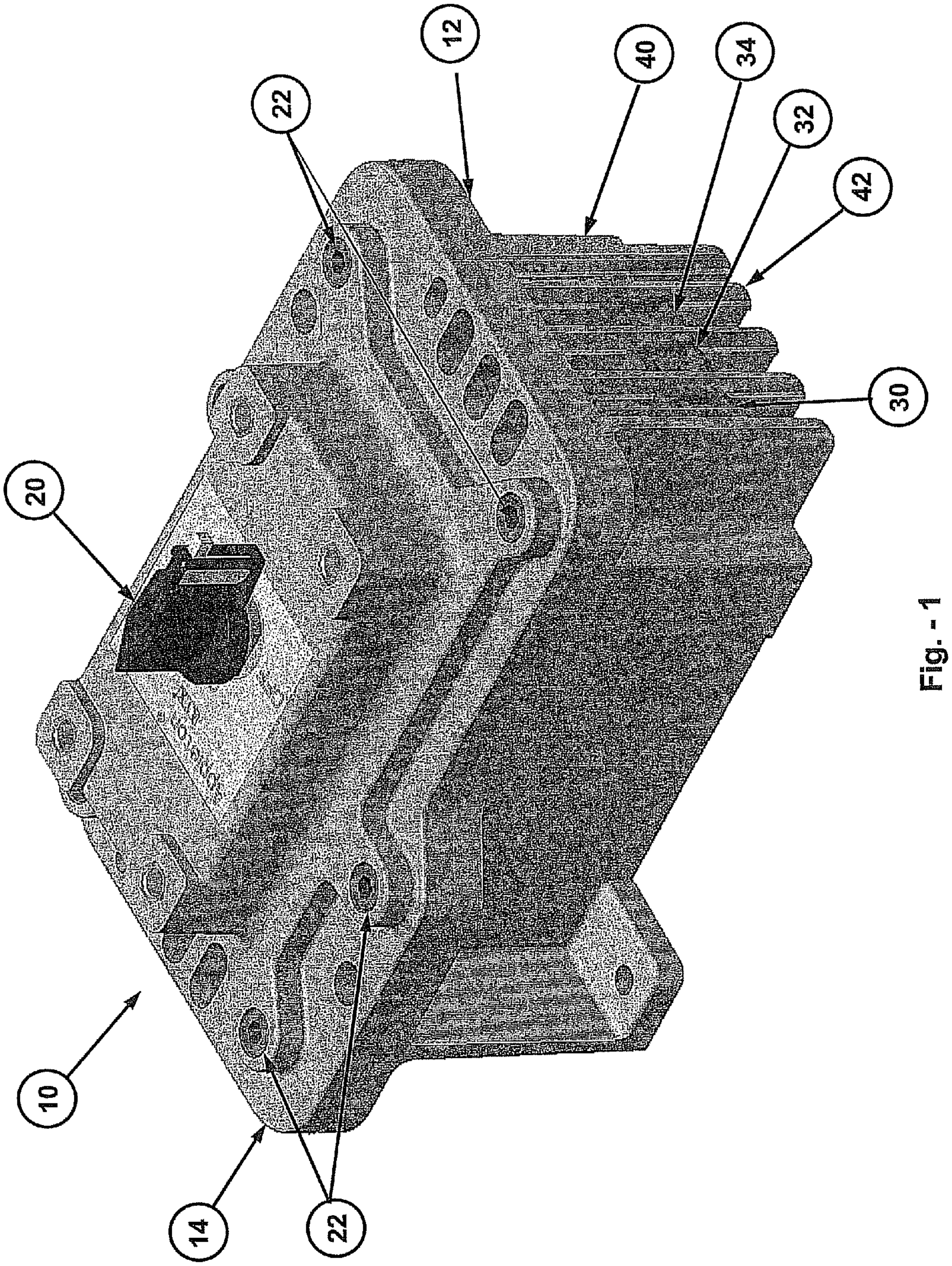
FIG. 1 is a perspective view of an embodiment of a sealed electrical enclosure.

Referring to FIG. 1, a perspective view of sealed electrical enclosure 10 is shown having bottom housing 12 and top housing 14, with top housing 14 being removably secured to bottom housing 12 using allenhead screws 22. Of course, the use of allenhead screws is not required, as any other suitable means of removably securing top housing 14 to bottom housing 12 could be used such as bolts, clips, screws, clamps, latches, etc. Preferably bottom housing 12 and top housing 14 are comprised of hard non-conductive material such as a plastic or composite material, preferably Solvay IXEF 1022, although IXEF 1521 or Ryton R-4 may also be suitable.

Sealed electrical enclosure 10 further includes an actuating mechanism knob 20 that allows for the manipulation of the switches of circuit breakers or other electrical components positioned within the enclosure 10. The actuating mechanism 20 provides for rotary actuation, although linear actuation could be used as well. Enclosure 10 may be used to house various types of circuit breakers and other electrical components such as circuit interrupters, motor switches, GFI devices, and photocells to name a few. Further, enclosure 10 may be used to house either or both IEC and NEC approved products.

As shown in FIG. 1, contact terminal holder assemblies 30, 32, and 34 are shown positioned between vertically extending ribs 42 positioned on a first sidewall 40 of the enclosure 10. Circuit breakers or other electrical products may be positioned entirely within enclosure 10 and electrically connected to electrical terminals in an electrical panel box (not shown). Using the configuration shown, sealed enclosure 10 provides for a flame proof housing for use in IEC Zone 1 and Zone 2, and possibly in other hazardous locations or areas classified by divisions or zones such as Class I, Zone 1, or Class I, Division 2

With the configuration of sealed electrical enclosure 10, by removing allenhead screws 22, top housing 14 may be removed from bottom housing 12. As a result, the circuit breakers or other electrical products positioned within the enclosure 10 may be removed and replaced, while allowing sealed electrical enclosure 10 to be reused. The circuit breakers or other electrical devices may be manipulated by the use of actuating mechanism knob 20 positioned outside of the electrical enclosure 10. Thus, the actuating mechanism knob 20 positioned outside of the enclosure 10, allows the enclosure 10 to be positioned within an electrical panel box (not shown), and still allow for the actuating mechanism knob to manipulate the switch of a circuit breaker or other electrical device positioned within enclosure 10.

Figure 2:
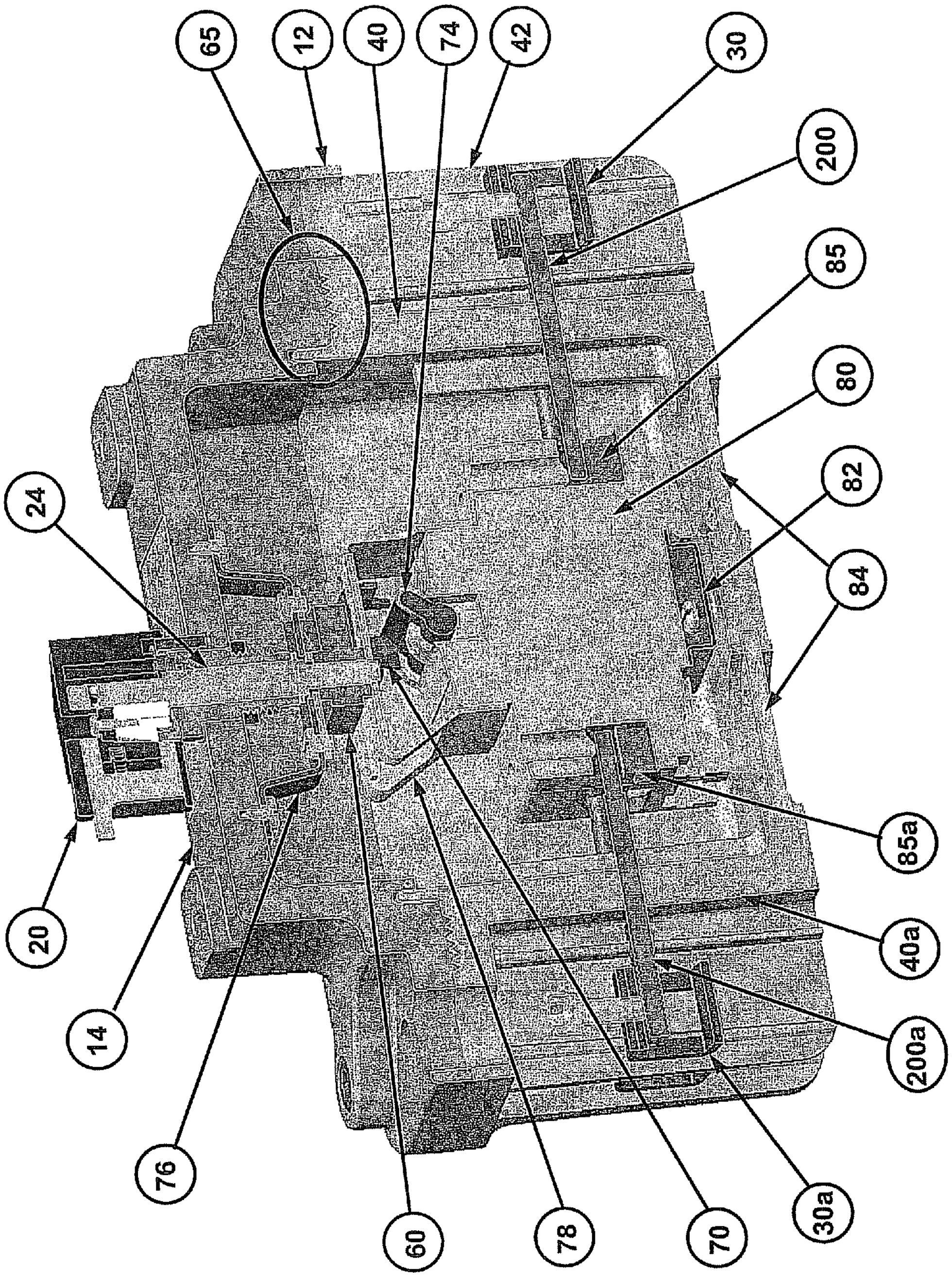
FIG. 2 is a cutaway view of an embodiment of the sealed electrical enclosure of FIG. 1.

FIG. 2 shows a sectional, perspective view of sealed electrical enclosure 10 with actuating mechanism knob 20 on top housing 14 wherein the knob 20 is attached to actuator shaft 24 which extends through the top cover 14 of enclosure 10 to a point within the enclosure 10. Actuator shaft 24 extends through link 60 and actuator block 78. As knob 20 is rotated, the actuator shaft 24 rotates to cause toggle operator 70 to manipulate the switch 74 positioned on top of circuit breaker or electrical device 80 positioned within the enclosure 10. As shown in FIG. 2, the circuit breaker or electrical device 80 is positioned on din rail 82 on the bottom of enclosure 10. Positioned on either side of the din rail 82 are venting plates 84.

Figure 3:
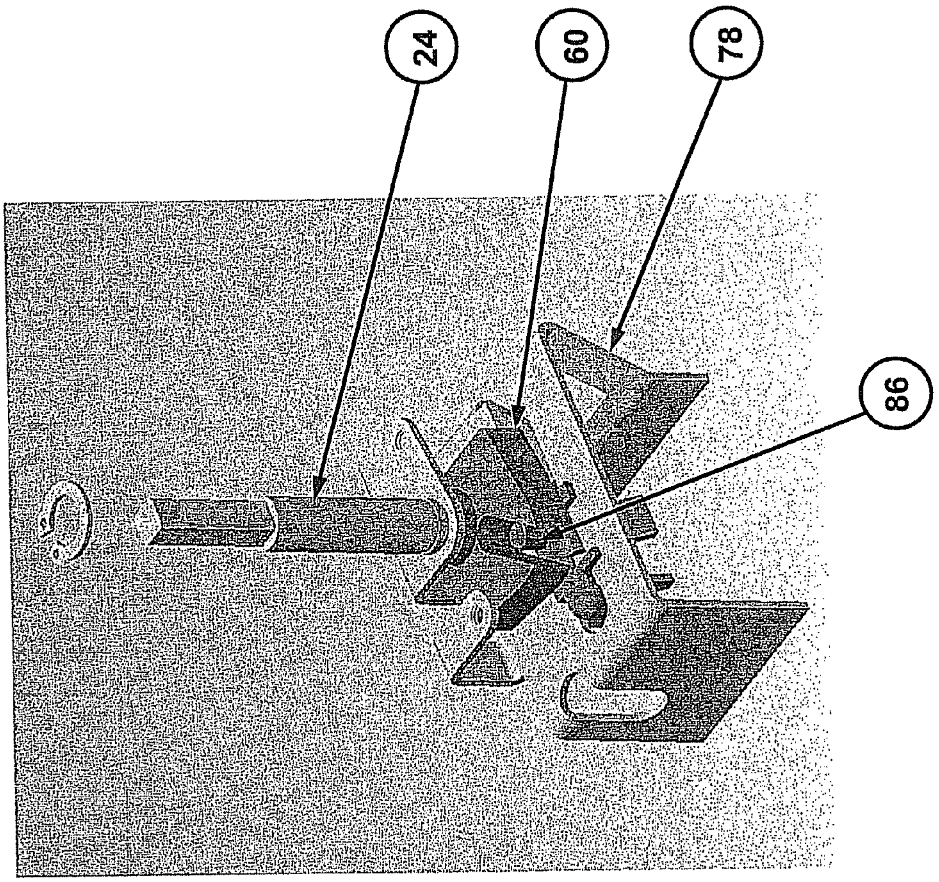
FIG. 3 is a perspective view of the actuator mechanism of FIG. 2.

FIG. 3 shows a close up view of the actuating mechanism shown in FIG. 2. In particular, actuator shaft 24 is shown extending through and connecting with link 60. When the actuator shaft 24 is rotated, the link 60 includes a slot positioned about switch manipulator 86 that is in turn positioned on actuator block 78. Rotation of link 60 causes the switch manipulator 86 to move in a linear direction which serves to manipulate the switch of the circuit breaker or other electrical device within the enclosure (not shown).

Figure 4A:
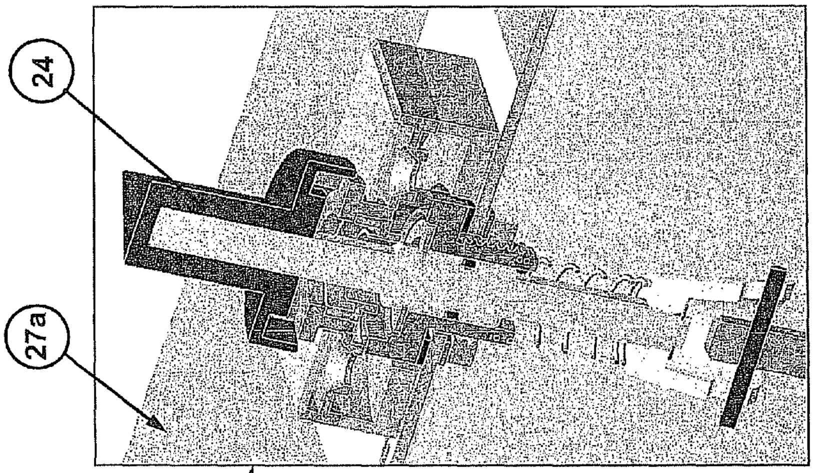
FIG. 4*a* is a cutaway close up view of the external actuator mechanism of FIG. 4.
Figure 4:
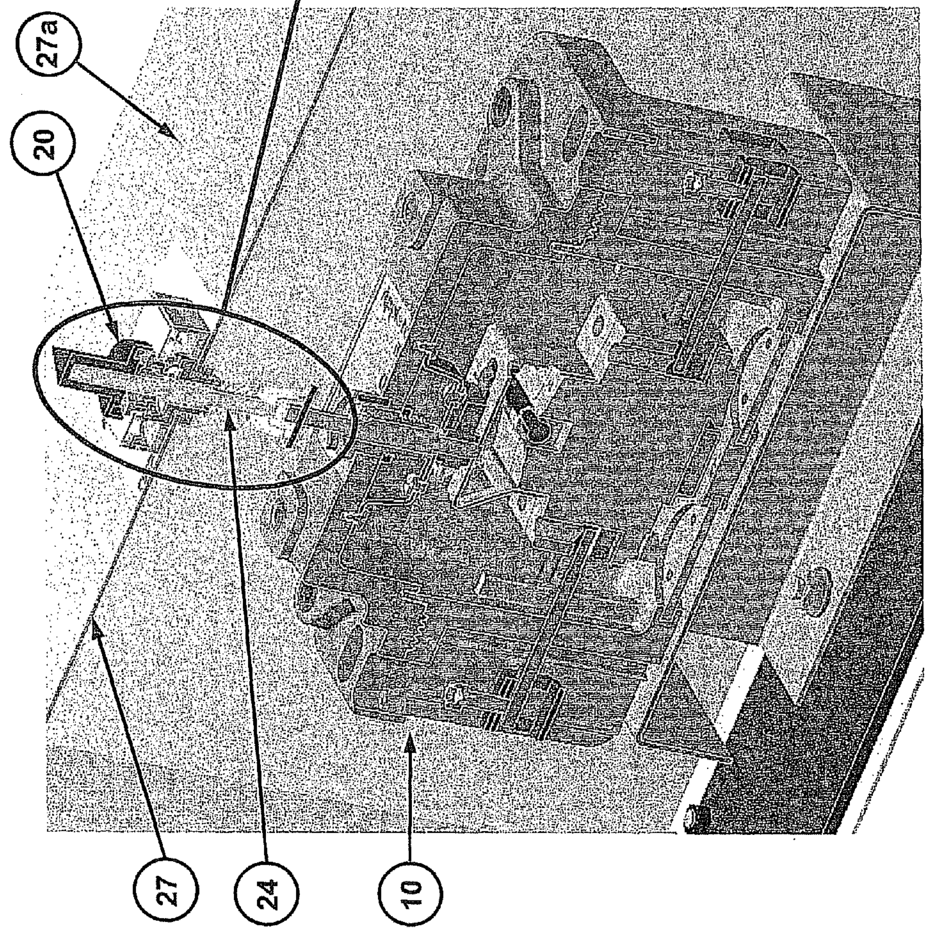
FIG. 4 is a cutaway view of a sealed electrical enclosure with an external actuator mechanism.

FIG. 2 discloses what can be referred to as an internal actuator mechanism. With an internal actuator mechanism, the electrical enclosure 10, including the actuating knob 20 is positioned within a distribution panel or enclosure. Because the actuator mechanism knob 20 is positioned within the distribution panel or enclosure, the enclosure has what is referred to as an internal actuator mechanism. Alternatively, as shown in FIG. 4, the electrical enclosure 10 may include an external actuator mechanism which is designed to have the actuator knob 20 positioned outside the distribution panel or enclosure 27 when the electrical enclosure 10 is positioned within the distribution panel or enclosure 27. In this embodiment, the actuator shaft 24 extends outwardly from the enclosure 10 a distance sufficient to extend through door 27*a* of distribution panel or enclosure 27. In this external actuator mechanism embodiment, the knob 20 may be rotated to manipulate the switch of the circuit breaker or other electrical device 80 of the electrical enclosure 10, which is positioned inside the distribution panel or enclosure 27. FIG. 4*a* is a close up cutaway view showing actuator shaft 24 extending through door 27*a* to the interior of the distribution panel or enclosure, while the knob 20 may be manipulated in a location external to the distribution panel or enclosure.

Figure 5:
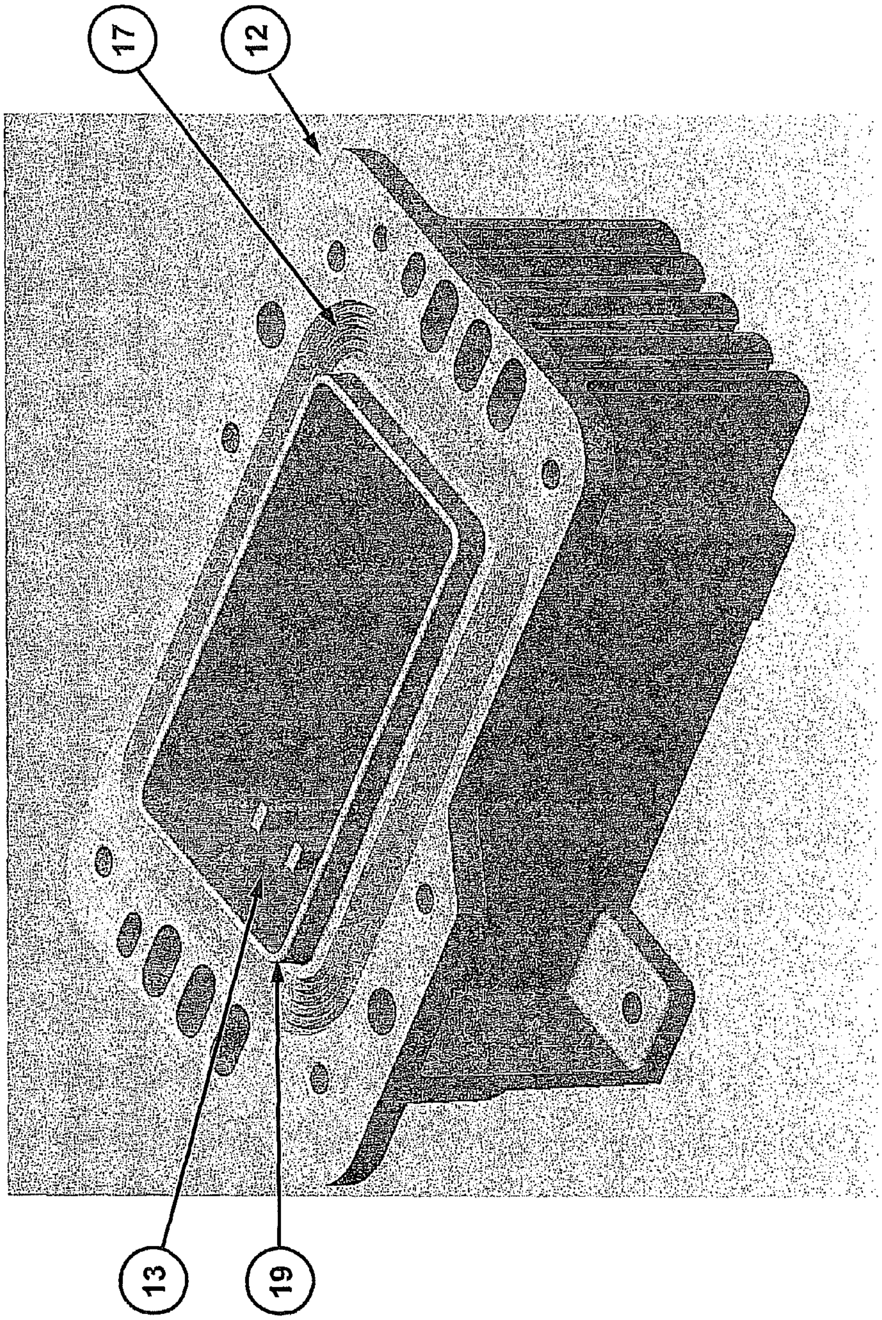
FIG. 5 is a perspective view of the bottom housing of the sealed electrical enclosure of FIG. 1.
Figure 5A:
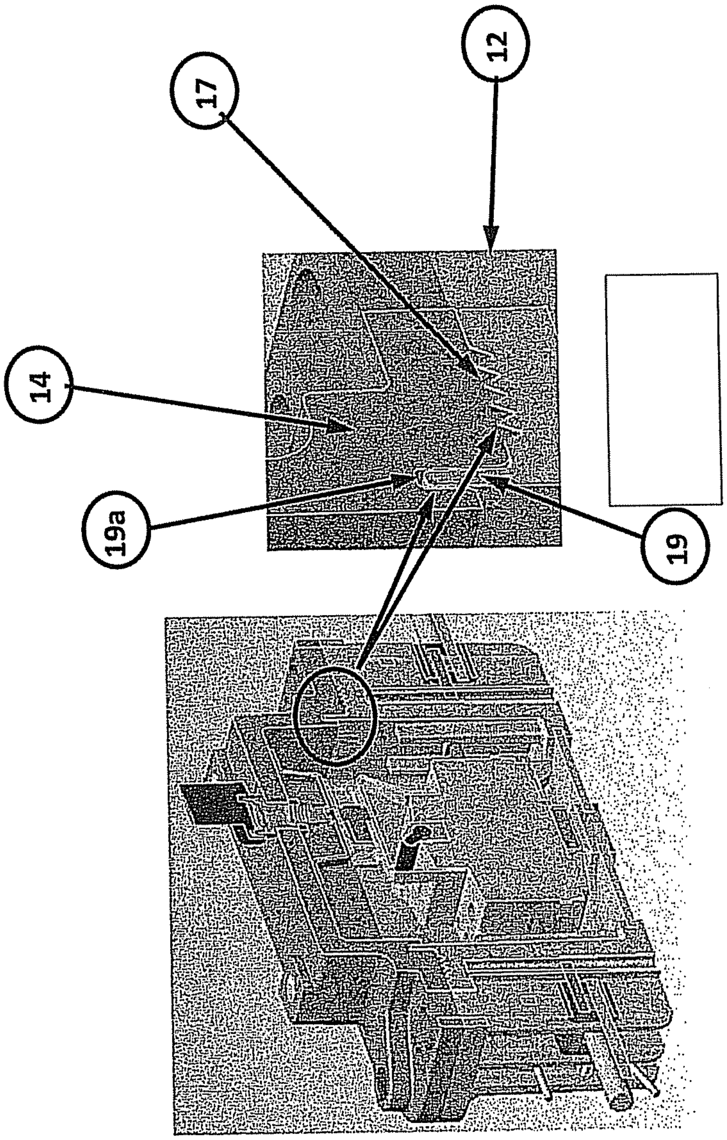
FIG. 5*a* is a cutaway view of the serrated and labyrinth joint between the top housing and the bottom housing.

FIG. 5 shows a perspective view of bottom housing 12 with a cavity 13 for housing circuit breakers or other electrical components. Bottom housing 12 includes a combination of a labyrinth joint and a serrated joint. In particular, bottom housing 12 includes serrations 17 that are designed to engage in a mating relationship with serrations on the bottom surface of the top housing of the enclosure (not shown). In addition, bottom housing 12 includes a labyrinth extension 19 that is designed to engage in a mating relationship with a labyrinth joint channel located on the bottom surface of the top housing of the enclosure (not shown). FIG. 5*a* shows the mating relationship of the serrated teeth 17 between the bottom housing 12 and the top housing 14 of the enclosure. The portion shown in FIG. 5*a* is a closeup view of the circled section 65 shown in FIG. 2. In this Figure, five fully engaged serrations are shown, although in some instances fewer or more engaged serrations may be appropriate, and teeth of varying size may be appropriate. In addition to the serrated teeth shown in FIGS. 5 and 5*a*, this embodiment further includes a labyrinth joint between the bottom housing 12 and the top housing 14 where the labyrinth extension 19 of the bottom housing 12 extends into and engages a corresponding labyrinth channel 19*a* positioned on the top housing 14. In this manner, with both a labyrinth joint and a serrated joint between the bottom housing 12 and the top housing 14, a greater deal of protection is provided allowing the device to qualify as an explosion proof housing, and meeting the flame path requirements needed to operate in IEC Zone 1, and Zone 2 environments, and possibly in Class I Division 2 environments, and in Class 1, Zone 1 environments. The enclosure could be provided with preferably only a labyrinth joint, although only a serrated joint, or a combination of a labyrinth joint and a serrated joint may be used.

Figure 6:
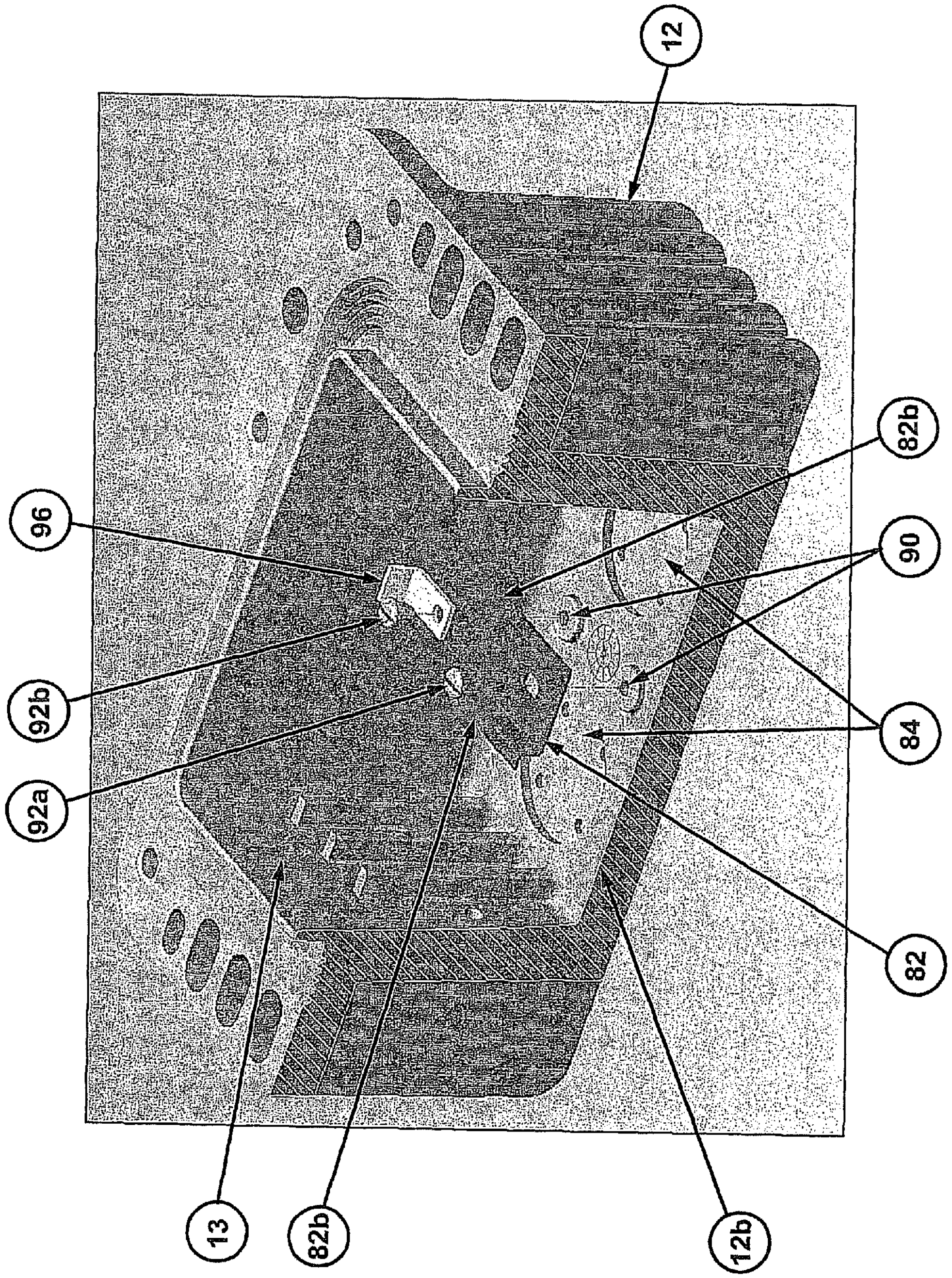
FIG. 6 is a cutaway view of a the bottom housing showing placement of a din rail.

The next series of Figures shows how to configure, assemble, and mount the circuit breakers or other electrical devices within the enclosure. FIG. 6 is a cutaway view of bottom housing 12. Two venting plates 84 are shown positioned on the bottom wall 12*b* of bottom housing 12. The venting plates 84 allow for pressure and heat to dissipate within the enclosure. Venting plate 84 is preferably formed of a sintered bronze material. Other materials could be used as the vent material such as stainless steel or aluminum depending upon the application. In FIG. 6, there are two separate venting plates 84 shown positioned in the bottom wall 12*b* of bottom housing 12. However, a single venting plate could also be used, as could additional venting plates.

Turning back to FIG. 6, two mounting holes 90 are shown on bottom wall 12*b* positioned between the venting plates 84. A din rail 82 is positioned between the venting plates and attached to the bottom wall 12*b* by use of mounting screws 92*a* and 92*b*, which in this embodiment are M4×6 screws. A stopper plate 96 is positioned between mounting screw 92*b* and din rail 82. In this manner, a base comprising the din rail 82 (as well as the stopper plate 96) may be positioned on the bottom wall 12*b* of the bottom housing 12 to allow for a variety of circuit breakers and other electrical devices to be positioned within cavity 13 of the enclosure. The din rail 82 includes oppositely disposed lips 82*b* that are designed to engage a bottom portion of a circuit breaker or other electrical device for mounting purposes.

Figure 7:
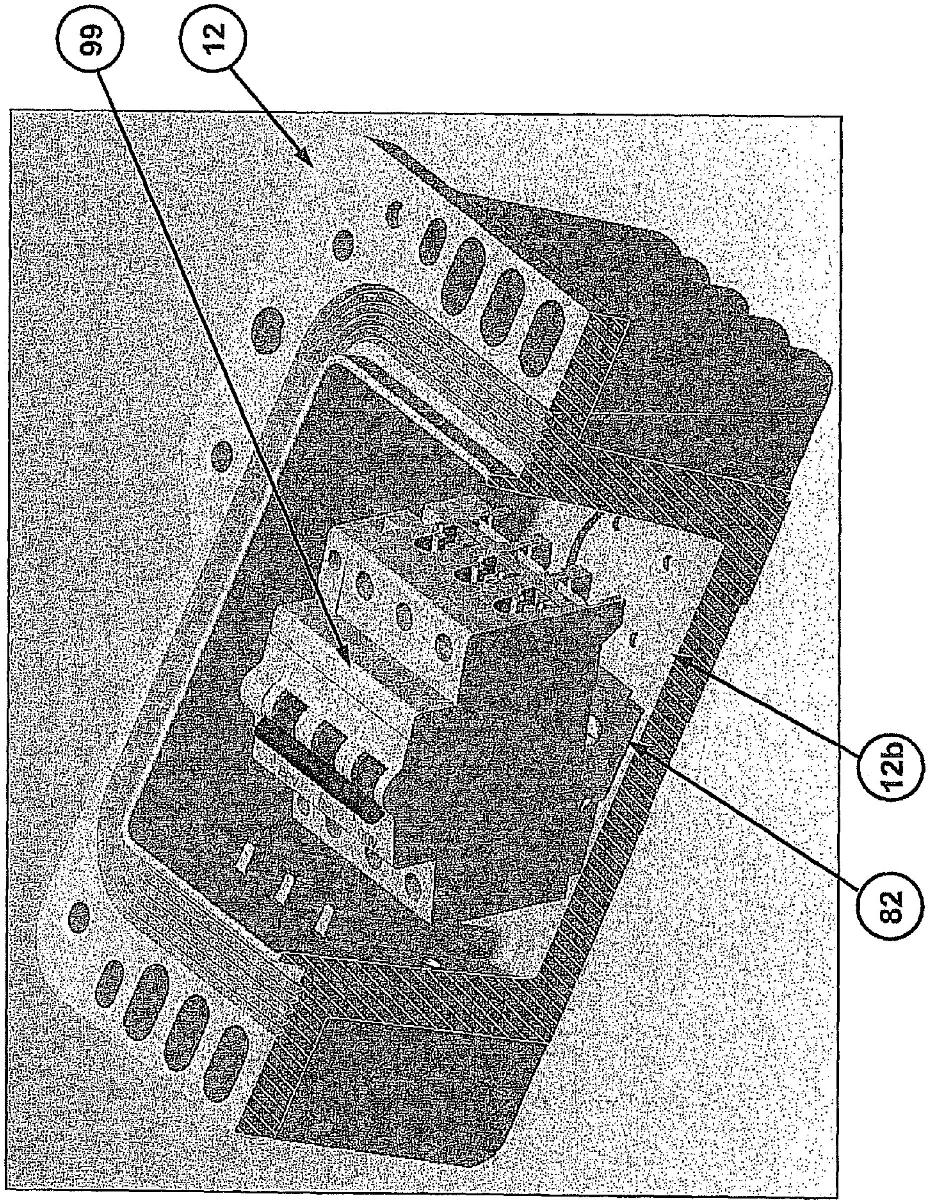
FIG. 7 is a perspective cutaway view of a circuit breaker being mounted onto the din rail in the bottom housing of the sealed electrical enclosure of FIG. 1.

FIG. 7 depicts the installation of a circuit breaker 99 onto the din rail 82 to mount the circuit breaker 99 onto the bottom wall 12*b* of the bottom housing 12. In practice, the circuit breaker 99 is tilted to one side and a portion of the bottom of the circuit breaker 99 engages the lip 82*b* of the din rail 82. The circuit breaker is then tilted back to its normal position where it engages the other lip 82*b* of din rail 82. In this manner, the circuit breaker 99 becomes removably attached to the din rail 82. Other types of circuit breakers and electrical devices may be attached to the din rail in the same manner. The stopper plate (shown in FIG. 6) is used to prevent lateral movement of the circuit breaker 99 or other electrical devices and to properly align the terminals of the circuit breaker 99 or other electrical devices with the sidewalls of the bottom housing 12.

Figure 8:
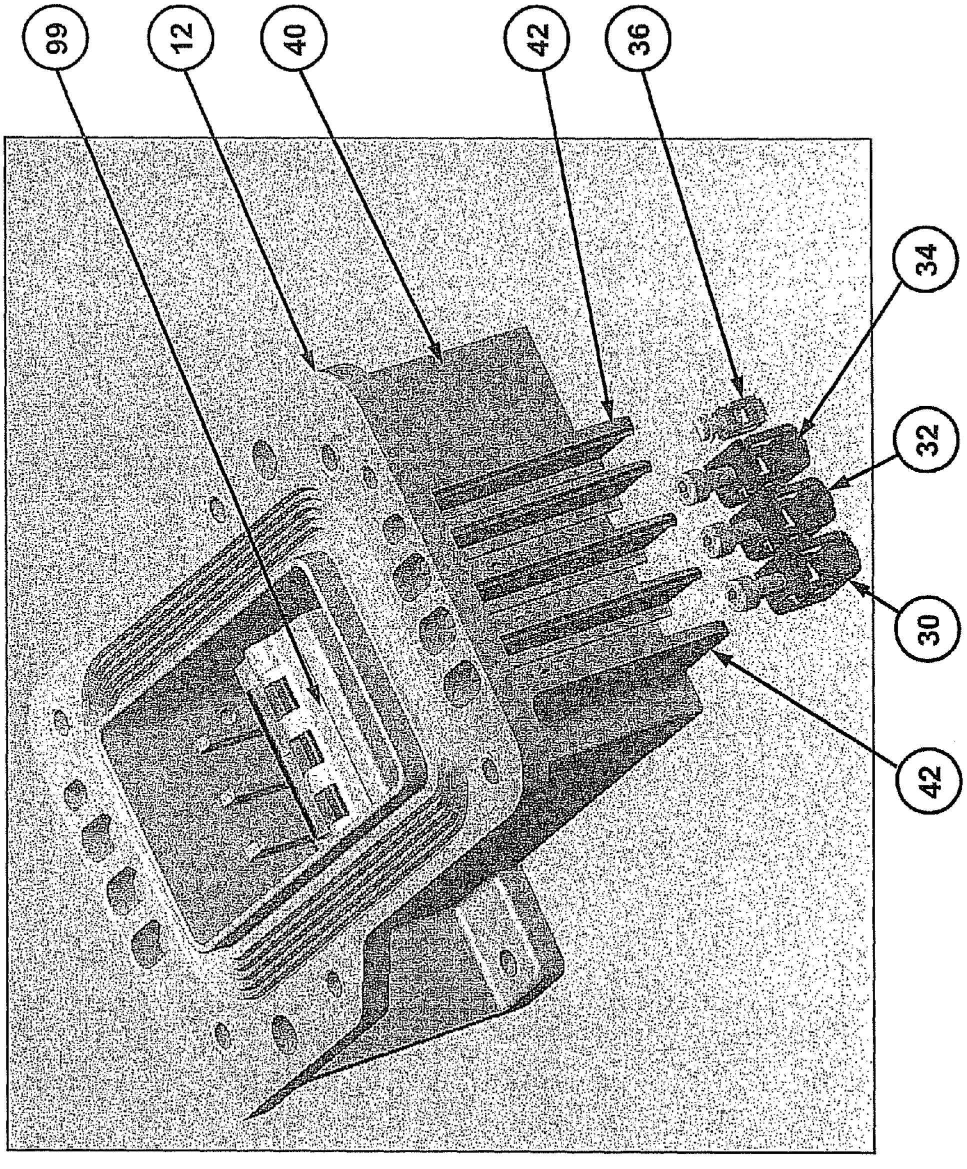
FIG. 8 is a perspective view of the bottom housing.

FIG. 8 is a perspective view of bottom housing 12 with circuit breaker 99 positioned therein. Vertical extending ribs 42 are shown extending outwardly from first sidewall 40 of bottom housing 12. Terminal holder assemblies 30, 32, and 34 are shown prior to positioning between vertically extending ribs 42 as shown in FIG. 1. Terminal holder auxiliary assembly 36 is also shown prior to positioning between vertically extending ribs 42.

Figure 9:
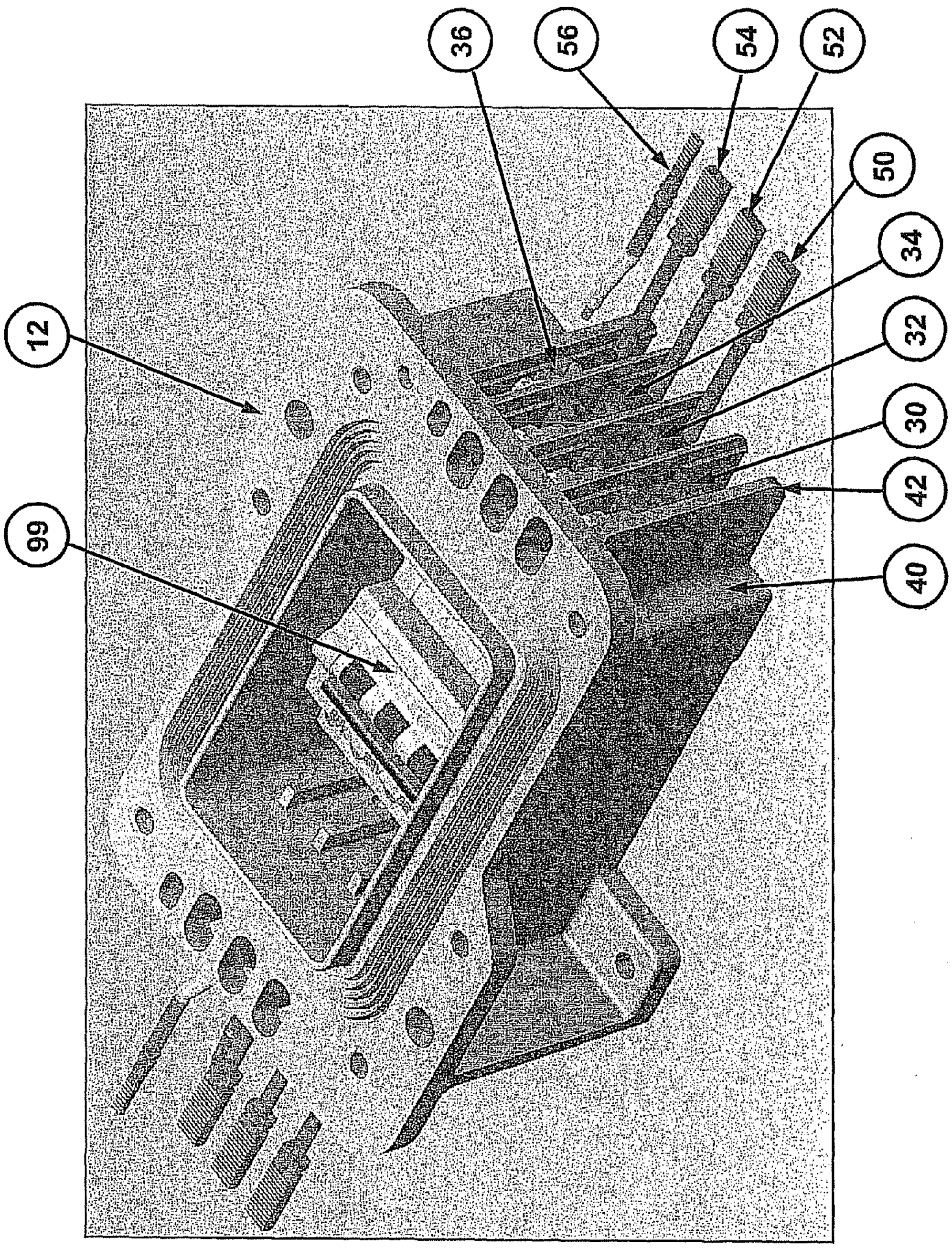
FIG. 9 is a perspective view of the bottom housing of the sealed electrical enclosure of FIG. 1 showing positioning of the electrical buses prior to assembly.

FIG. 9 is a perspective view of bottom housing 12 with circuit breaker 99 positioned therein. Terminal holder assemblies 30, 32, and 34 are shown positioned between vertically extending ribs 42 on sidewall 40. Terminal holder auxiliary assembly 36 is also shown positioned between vertical extending ribs 42 on sidewall 40. Also shown awaiting positioning in the terminal holder assemblies 30, 32, and 34 are contact terminal buses 50, 52, and 54. Terminal holder auxiliary assembly 36 is also shown positioned between vertically extending ribs 42. Contact terminal bus with flexible wire assembly 56 is also shown awaiting positioning between ribs 42.

Figure 10:
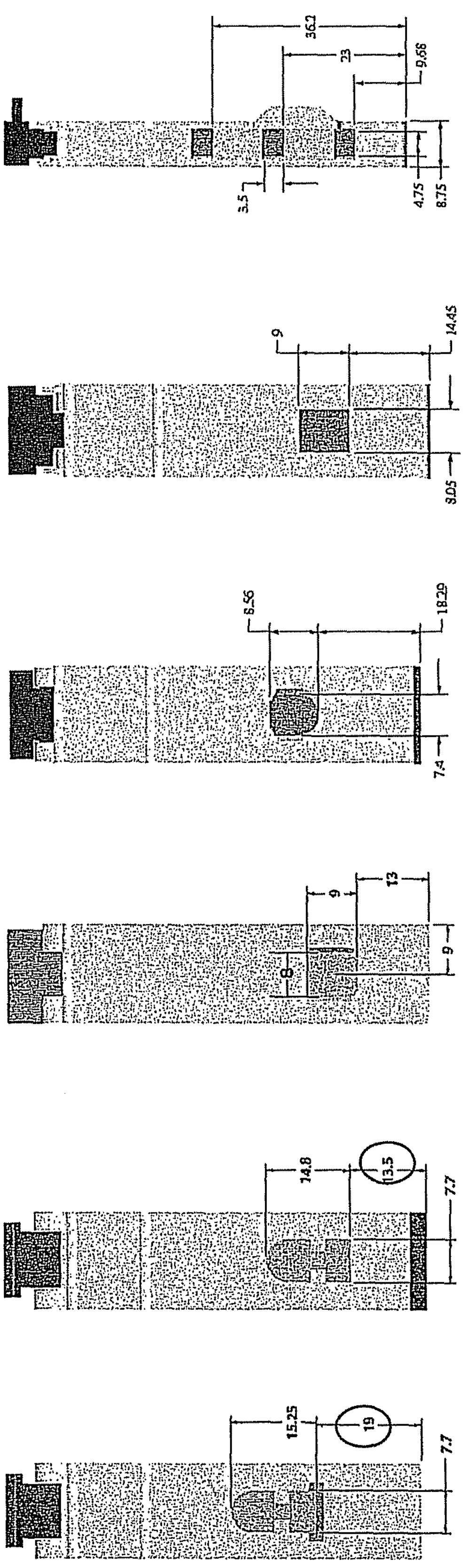
FIG. 10 is a view of a variety of various circuit breakers.

The present embodiments envision the use of a variety of different types of circuit breakers and other electrical components positioned within the enclosure. The present embodiments are designed for use with a wide variety of different circuit breakers and components made by a variety of different manufacturers. An example of the variety of different types of circuit breakers available and the varying geometries used is illustrated in FIG. 10. Given the variety and geometry of the different circuit breakers available, the present embodiments envision machining/drilling holes into the sidewalls of the bottom housing 12, with the locations of such holes dependent upon the geometry of the particular circuit breaker chosen. The drilling of holes adapted for use with a specific circuit breaker allows the housing to be customized for use with such specific circuit breaker. To adapt the bottom housing 12 for use with a particular circuit breaker, holes are drilled at specified locations in the sidewalls of the bottom housing 12 corresponding to the location of the bus ports of the particular circuit breaker. To fulfill the requirements of IEC 60079-1/IECEx 60079-1 (Electrical apparatus for explosive gas atmospheres. Part 1: Construction and verification test of flameproof enclosures of electrical apparatus), the holes must be drilled very accurately with tolerances on diameter of +0.02/+0.05 mm.

Softer plastics, like many thermoplastics, tend to tear when local load concentrations occur. Thermoplastics are a good thermal insulator, meaning that the high energy imparted by cutting tools turns into frictional heat that, because it does not dissipate easily, quickly reaches the melting point of many plastics and even the burning point of others. Essentially all plastics have heat-distortion limits where the plastics lose rigidity and strength. Therefore, for machining operations, it is beneficial to use special cutting tools and techniques to achieve desired results.

For example, drills that are not made of high-speed steel or solid carbide should have carbide or diamond tips. Also, drills should have highly polished flutes and chrome-plated or nitrided surfaces. The drill design preferably has the conventional land, the spiral with regular or slower helix angles (16-30 degrees), the rake with positive angle (0 to +5 degrees), the point angle conventional angles (90-118 degrees), the end angle with conventional values (120-135 degrees), and the lip clearance angle with conventional values (12-18 degrees).

With regard to reaming, high-speed or carbide-steel machine reamers will ream accurately sized holes in thermoplastic. It is preferable to use a reamer 0.015-0.126 mm larger than the desired hole size to allow for the resiliency of the plastic. Tolerances as close to +/−0.01 mm can be held in through holes 15 mm in diameter. Fluted reamers are best for obtaining a good finished surface. In addition, reamer speeds preferably approximate those used for drilling. The amount of material removed per cut will vary with the hardness of the plastic, and although reaming can be dry, it is preferable to use water soluble coolants to produce better finishes.

Figure 11:
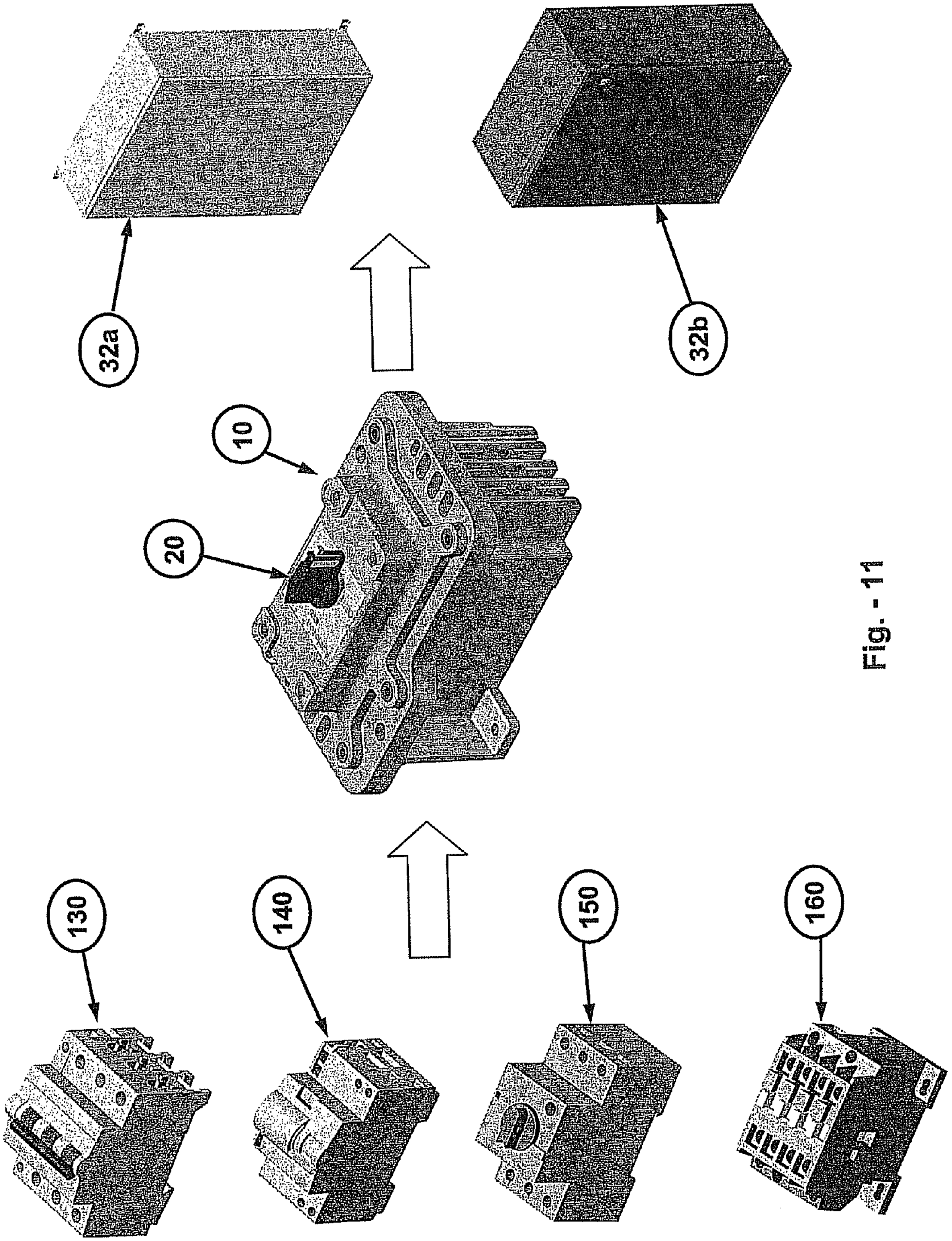
FIG. 11 is a perspective view of various electrical components that could be positioned in the sealed electrical enclosure of FIG. 1.

The present enclosure is designed to house a plurality of different circuit breakers or other electrical components. Although it could be used to house a single circuit breaker or electrical component, it preferably is designed to house a plurality of such components. In one embodiment, a 3.5 module design is provided. In the 3.5 module design, the enclosure may house one two pole circuit breaker and an auxiliary contact. It also may be used with one (pole+neutral) circuit breaker with GFI and an auxiliary contact. FIG. 11 illustrates the various electrical devices that may be positioned within the enclosure 10. For example, circuit breaker 130 having three poles and one auxiliary contact could be placed in enclosure 10. Similarly GFI breaker 140, motor starter 150, and contactor/relay 160 could also be placed within enclosure

10. In FIG. 11, the enclosure 10 is shown with actuator knob 20 designed for use as an internal actuator mechanism as the enclosure 10 (and knob 20) are designed to be enclosed within stainless steel enclosure 32*a* or plastic enclosure 32*b*.

Figure 13:
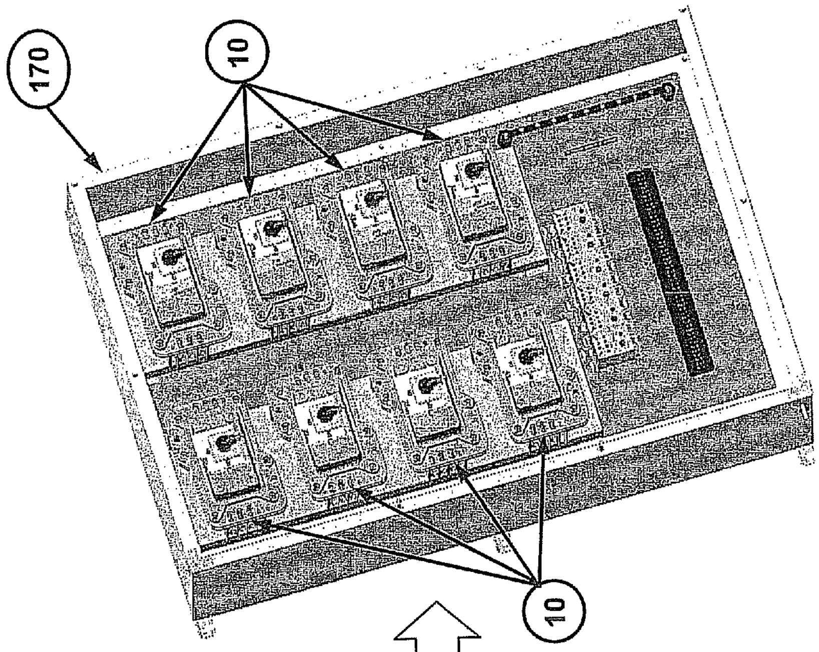
FIG. 13 is a perspective view showing sealed electrical enclosure positioned within an electrical panel box.
Figure 12:
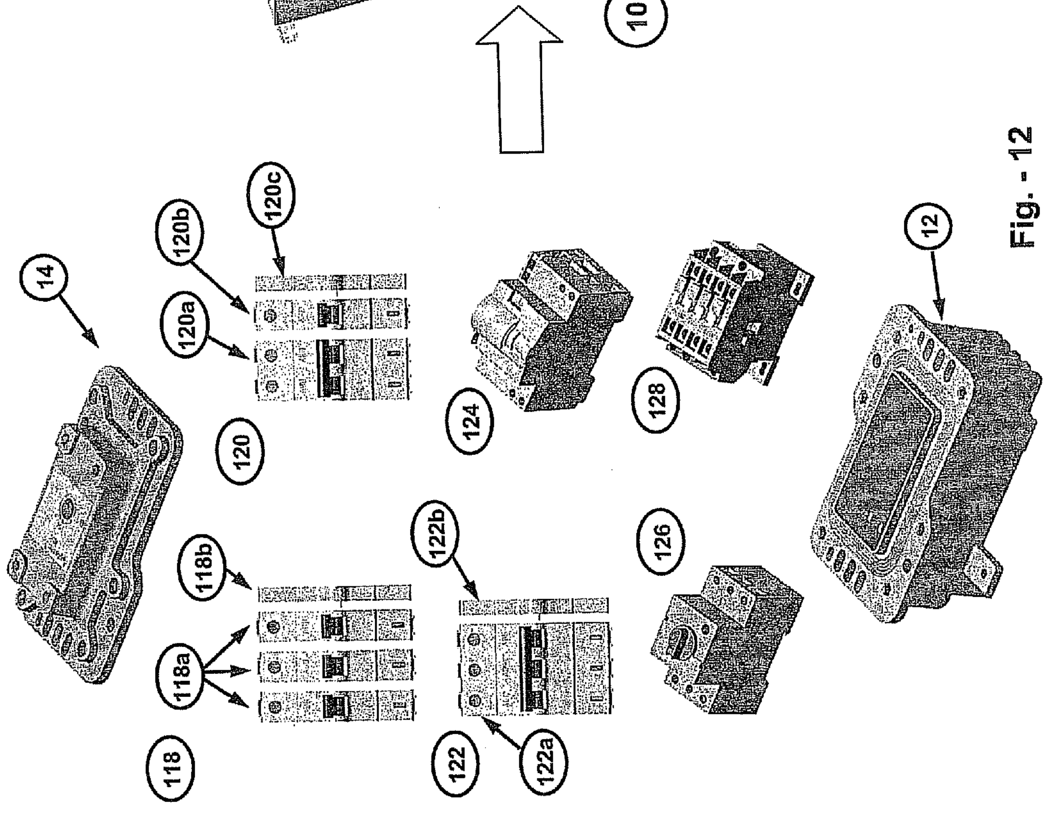
FIG. 12 is another perspective view showing various configurations of electrical components that could be positioned in the sealed electrical enclosure.
Figure 14:
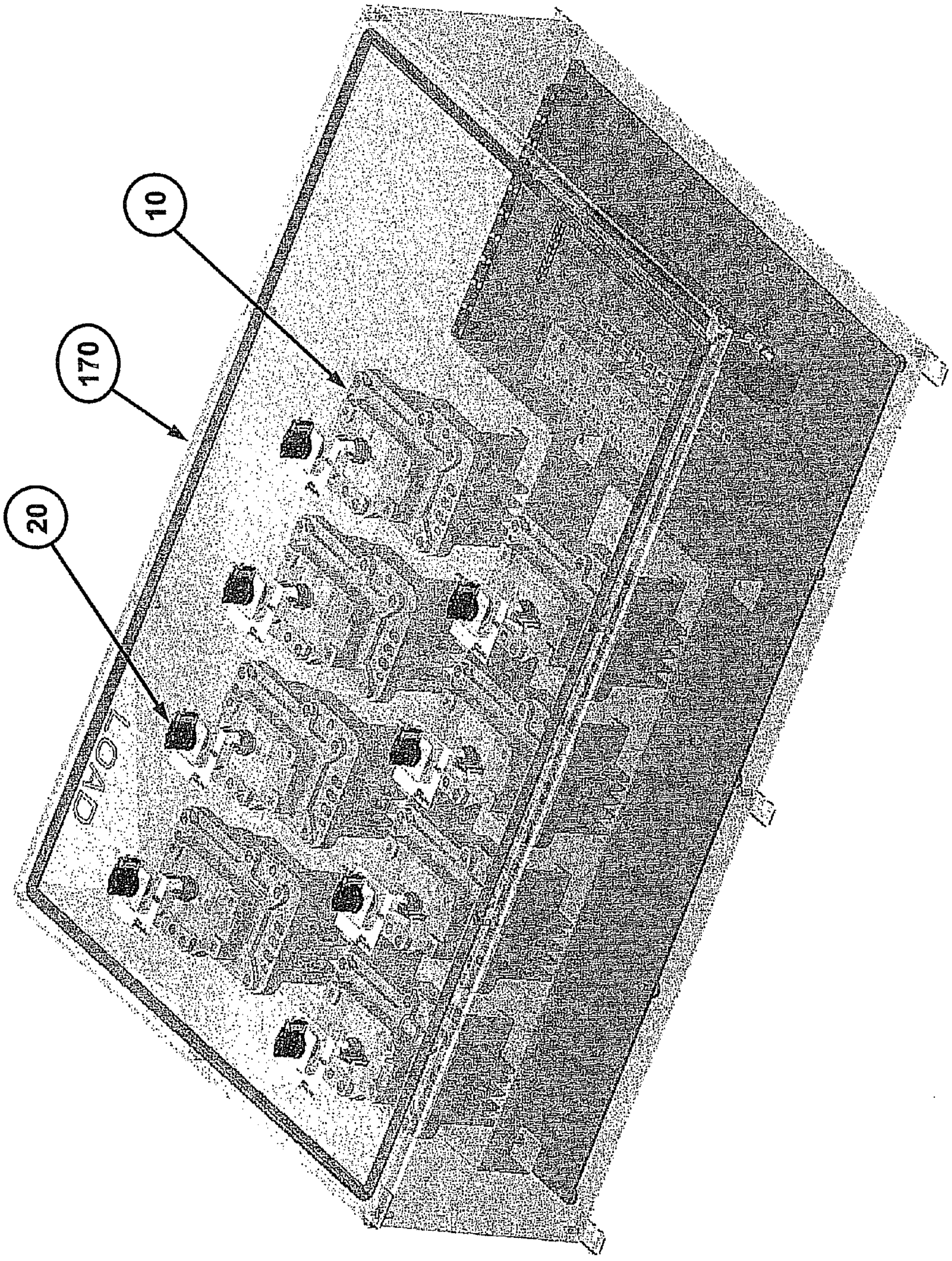
FIG. 14 is a perspective view of sealed electrical enclosures positioned within an electrical panel box with an external actuator mechanism.

In FIG. 12, another illustration is shown regarding the various configurations of circuit breakers and electrical components that can be positioned within the sealed breaker. For example, configuration 118 includes three single pole breakers 118*a* and an auxiliary contact 118*b*. Configuration 120 includes one two pole breaker 120*a*, one single pole breaker 120*b*, and one auxiliary contact 120*c*. Configuration 122 includes one three pole breaker 122*a* and one auxiliary contact 122*b*, configuration 124 is a GFI breaker, configuration 126 is a motor starter, and configuration 128 is a contactor/relay. Each of the configurations 118, 120, 122, 124, 126, and 128 may be positioned within bottom housing 12, and once top housing 14 is secured to bottom housing 14, a sealed electrical enclosure 10 is created. In FIG. 13, eight different sealed devices 10 are shown mounted on an electrical panel 170. It is contemplated that sealed enclosures 10 may be mounted in suitable electrical panels boxes, including stainless steel, plastic, and thin-wall cast panel boxes. FIG. 14 shows that sealed enclosures 10 are provided with external actuators, as actuator knobs 20 may be manipulated externally from electrical panel 170.

Returning now back to the assembly and installation of the circuit breakers within the enclosure 10, once the determination is made regarding which circuit breakers or other electrical components will be positioned within the enclosure and removably secured to the din rail positioned on the bottom wall of the bottom housing, then the holes for the buses must be drilled in the locations associated with the geometry for that particular circuit breaker or other electrical device.

Once the holes for the buses are drilled, then the buses must be installed. Referring back to FIG. 2, bus 200 is shown installed in the enclosure 10. In particular, bus 200 extends through a drilled hole in sidewall 40 of bottom housing 12 where a first end of bus 200 extends into engagement with contact port 85 of circuit breaker 80. A second end of bus 200 is positioned in a location external to the inside of bottom housing 12 and where it engages terminal assembly 30. A similar configuration exists on the opposite wall 40*a* of the bottom housing 12, where bus 200*a* extends through a drilled hole in sidewall 40*a* of bottom housing 12 where a first end of bus 200*a* extends into engagement with contact port 85*a* of circuit breaker 80. A second end of bus 200*a* is positioned in a location external to the inside of bottom housing 12 and where it engages terminal assembly 30*a*.

Figure 15B:
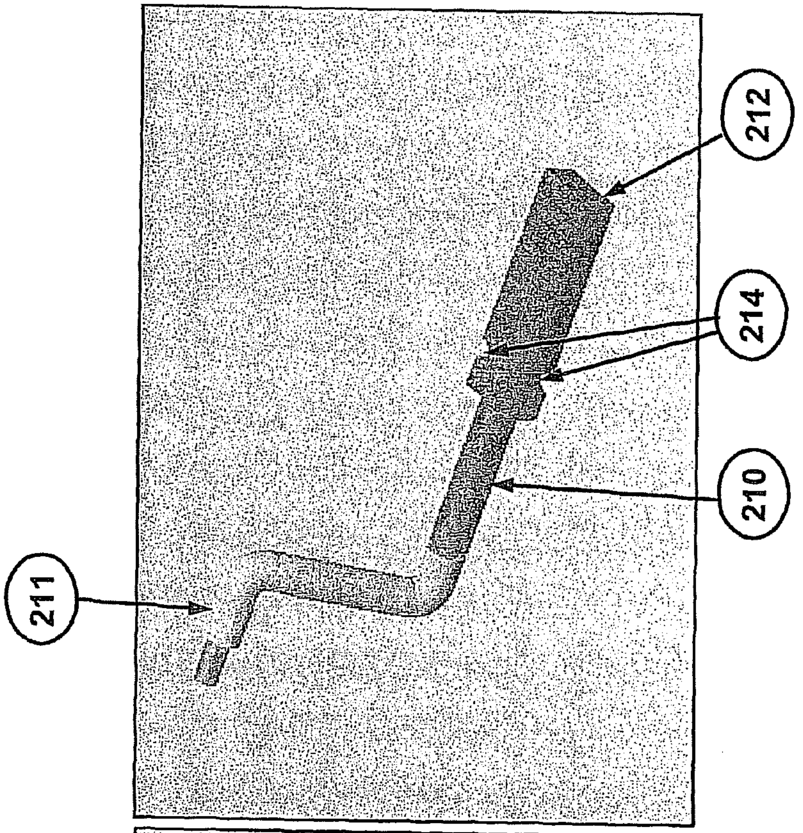
FIG. 15*b* is a perspective view of an electrical bus for use in connecting an auxiliary contact in the sealed enclosure of FIG. 1.
Figure 15A:
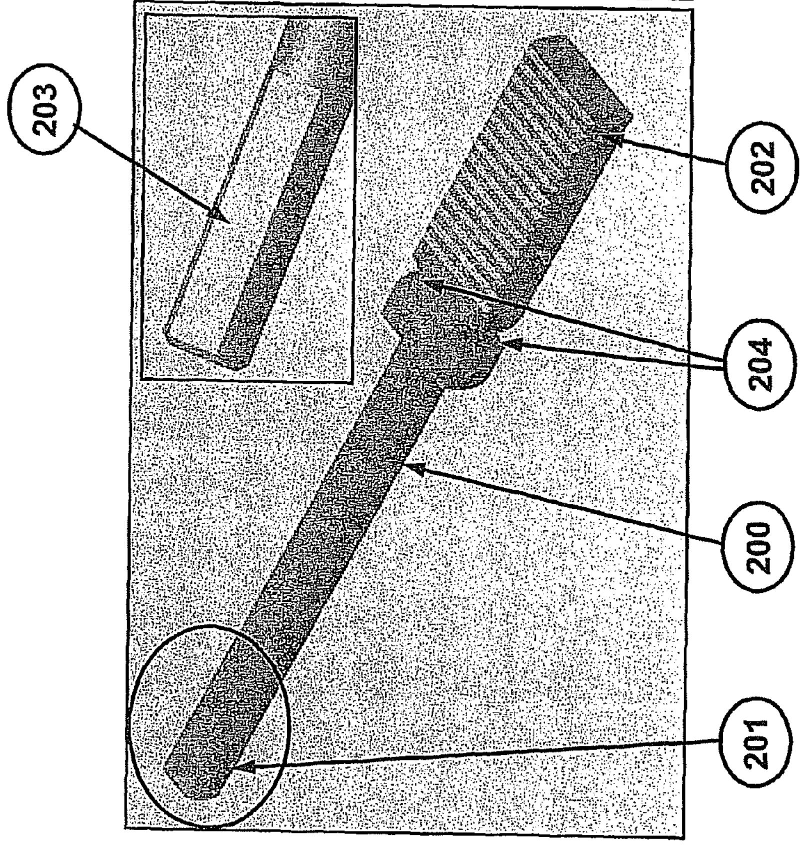
FIG. 15*a* is a perspective view of an electrical bus for use in the sealed electrical enclosure of FIG. 1.

In FIGS. 15*a* and 15*b*, the electrical buses 200 and 210 are shown. Electrical bus 200 has a first end 201 that includes flats 203 for engaging the contact port of a circuit breaker or other electrical device within the sealed electrical enclosure. Similarly, electrical bus 210 has a first end 211 that includes a flexible wire and is adapted for connection to an auxiliary contact within the sealed electrical enclosure. Both electrical bus 200 and 210 include a second end 202 and 212 respectively that is shown including a flat section to improve manipulation of the bus during assembly. Electrical bus 200 includes two slots 204 that are designed to engage with slots on the ribs of the sidewall of the bottom housing (not shown). Electrical bus 210 similarly includes two slots 214 that are designed to engage with slots on the ribs of the sidewall of the bottom housing (not shown). The electrical buses 200 and 210 are preferably made of a conductive material such as brass with tinning finish, or a copper strip with nickel plating. A screw or other self collapsing locking mechanism on the circuit breaker is used to secure the end of the electrical bus to the circuit breaker.

Figure 16:
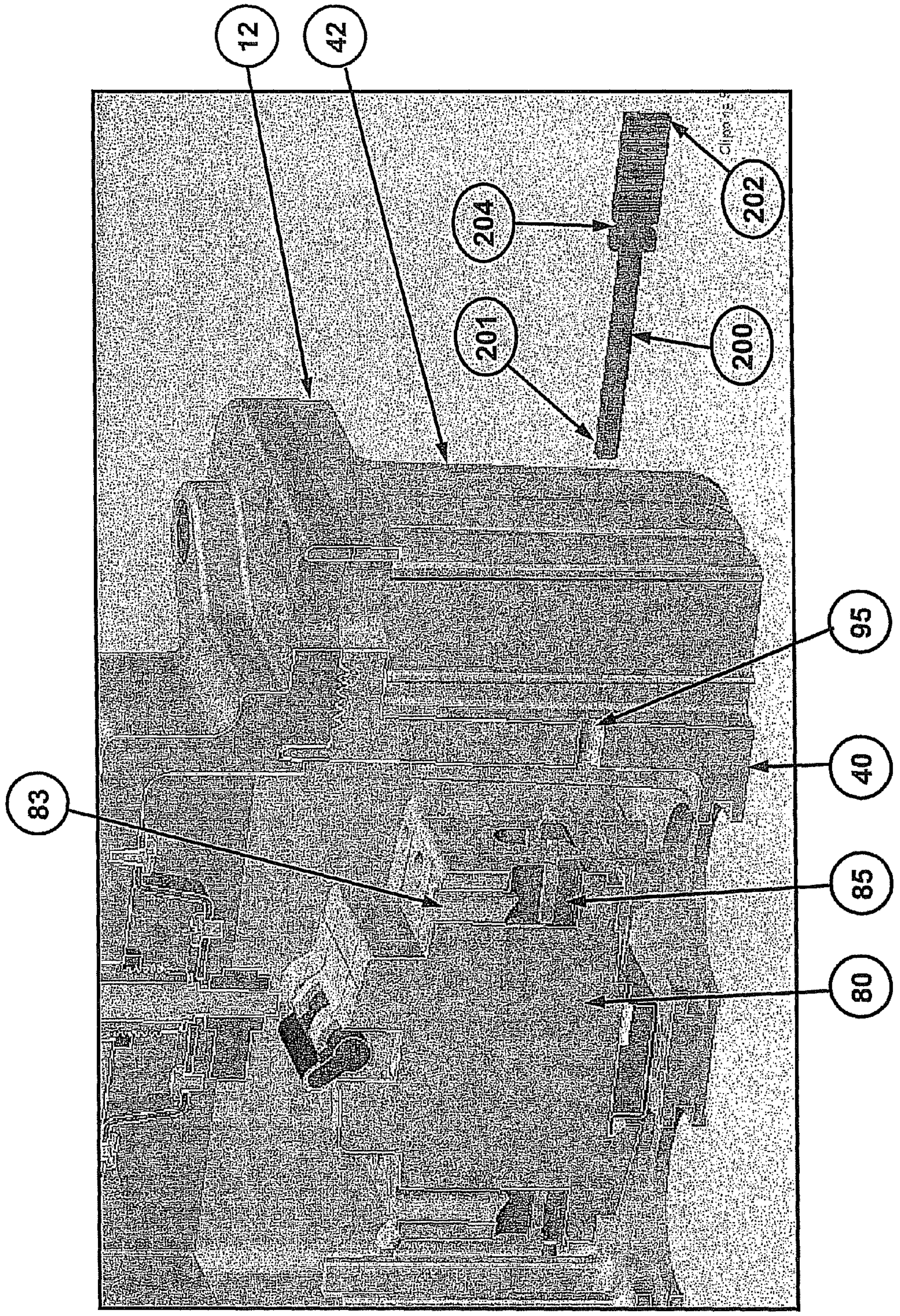
FIG. 16 is a cutaway view of the sealed electrical enclosure showing the electrical bus just prior to assembly into the enclosure.
Figure 17:
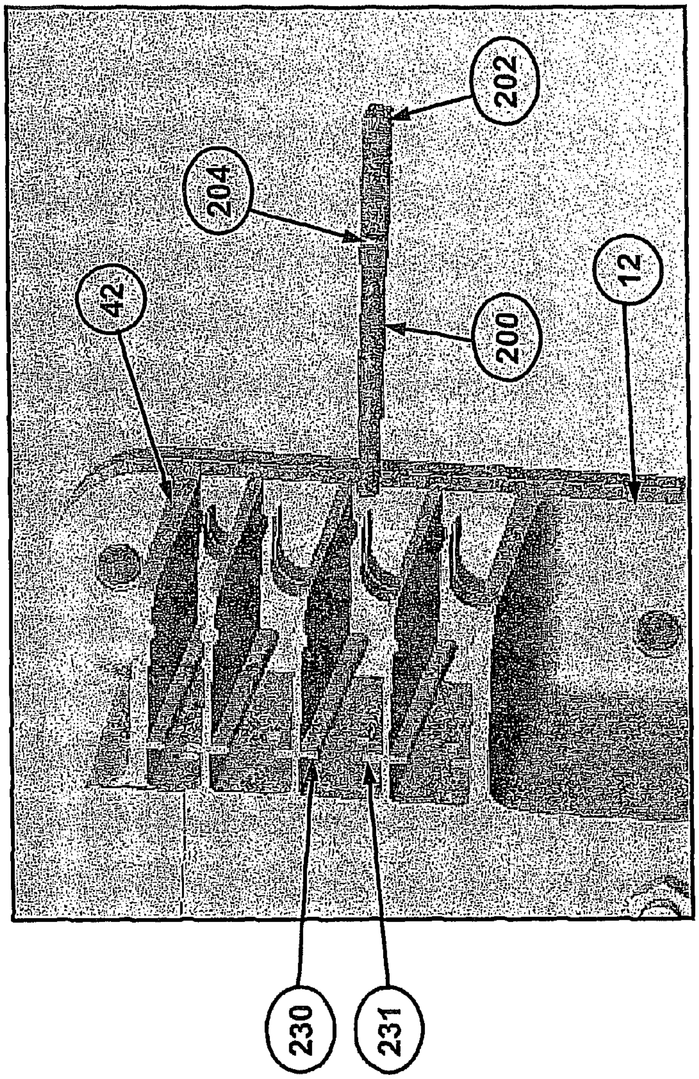
FIG. 17 is a perspective view of the side wall and extending ribs of the bottom housing of the sealed electrical enclosure.

In FIG. 16, electrical bus 200 is shown just prior to positioning through sidewall 40 of bottom housing 12. Hole 95 is shown that has been drilled through sidewall 40 and in alignment with the contact port 85 of circuit breaker 80. The electrical bus is press fit through hole 95 in sidewall 40 and the first end 201 of the electrical bus is moved into engagement with contact port 85 of the circuit breaker 80. A screw may be inserted through aperture 83 of the circuit breaker 80 to secure the first end 201 of the electrical bus 200 within the contact port 85 of circuit breaker 80. When inserting the electrical bus 200, the flat surface of second end 202 of the electrical bus 200 should be coplanar with the ribs 42 of bottom housing 12 as shown. As shown in FIG. 17, the flat second end 202 of electrical bus 200 is inserted between the ribs 42 of bottom housing 12 and passes through the inwardly directed ridges 230 and 231 that extend from vertical ribs 42.

Figure 18:
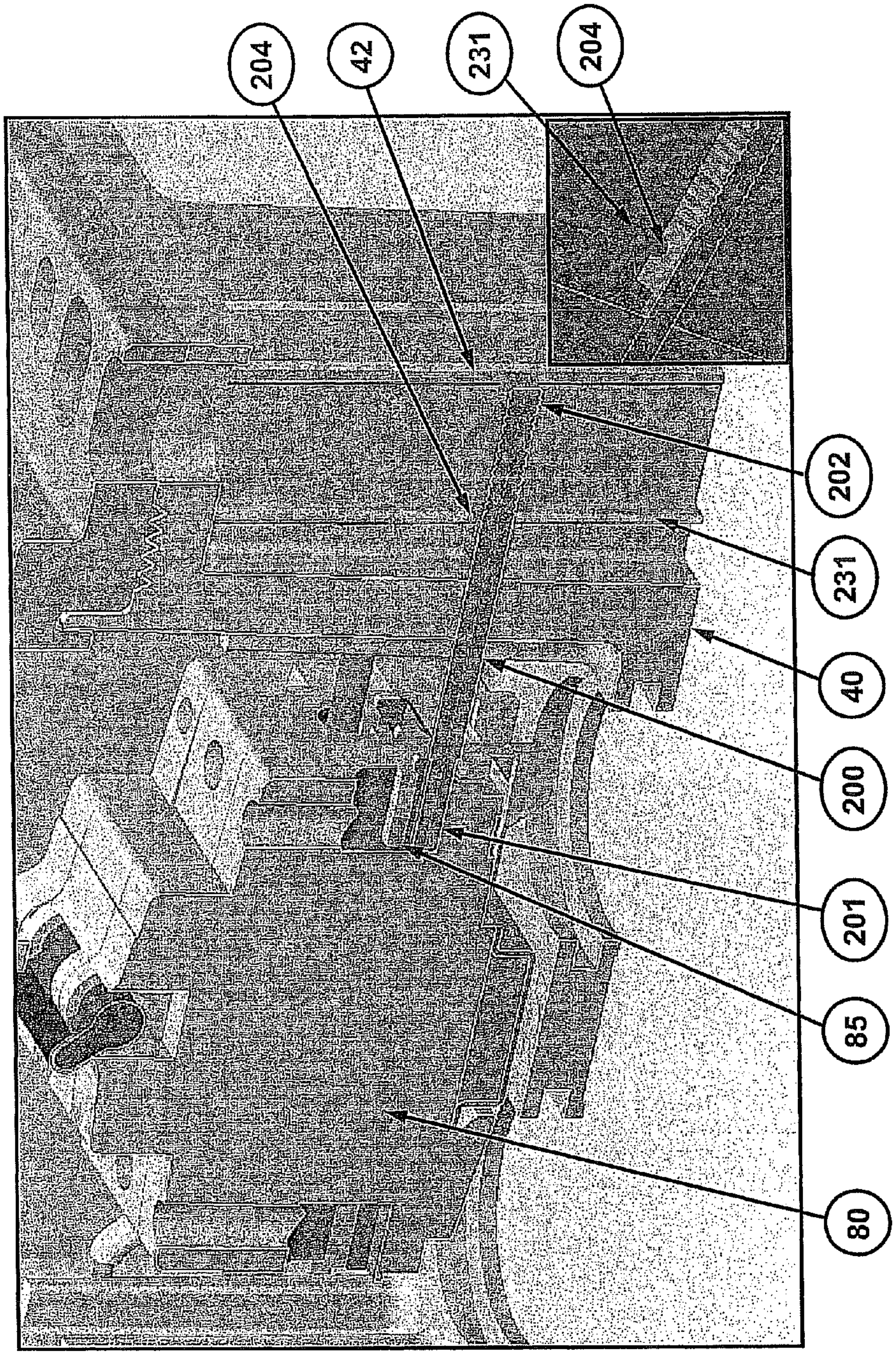
FIG. 18 is a cutaway view of the sealed electrical enclosure showing the placement of the electrical bus through the sidewall an into engagement with the circuit breaker positioned within the bottom housing.

Once the first end of the bus is inserted into the contact port of the circuit breaker, then the electrical bus should be rotated 90 degrees so that the slots 204 engage with ridges 230 and 231. FIG. 18 shows the electrical bus 200 properly positioned and connected to circuit breaker 80. In particular, first end 201 of electrical bus 200 is shown positioned in contact port 85 of circuit breaker 80. Electrical bus extends through sidewall 40 of the bottom housing and the second end 202 of the electrical bus 200 is positioned between ribs 42 of the sidewall. The second end 202 has been rotated 90 degrees so that slot 204 is engaged with the ridge 231 extending vertically and inwardly from rib 42.

Figure 19:
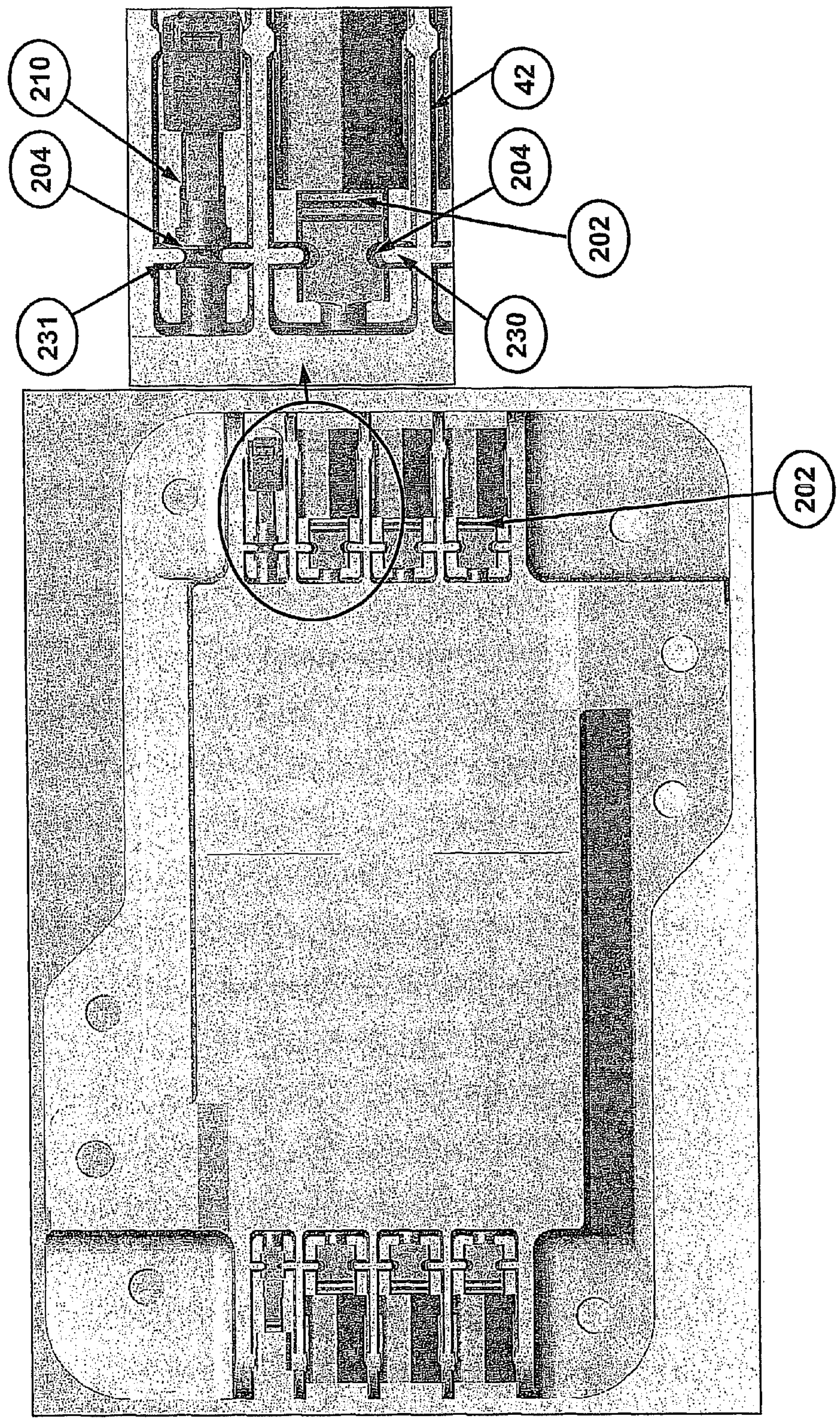
FIG. 19 is a bottom view of the electrical buses positioned within the bottom housing of the sealed electrical enclosure.
Figure 20:
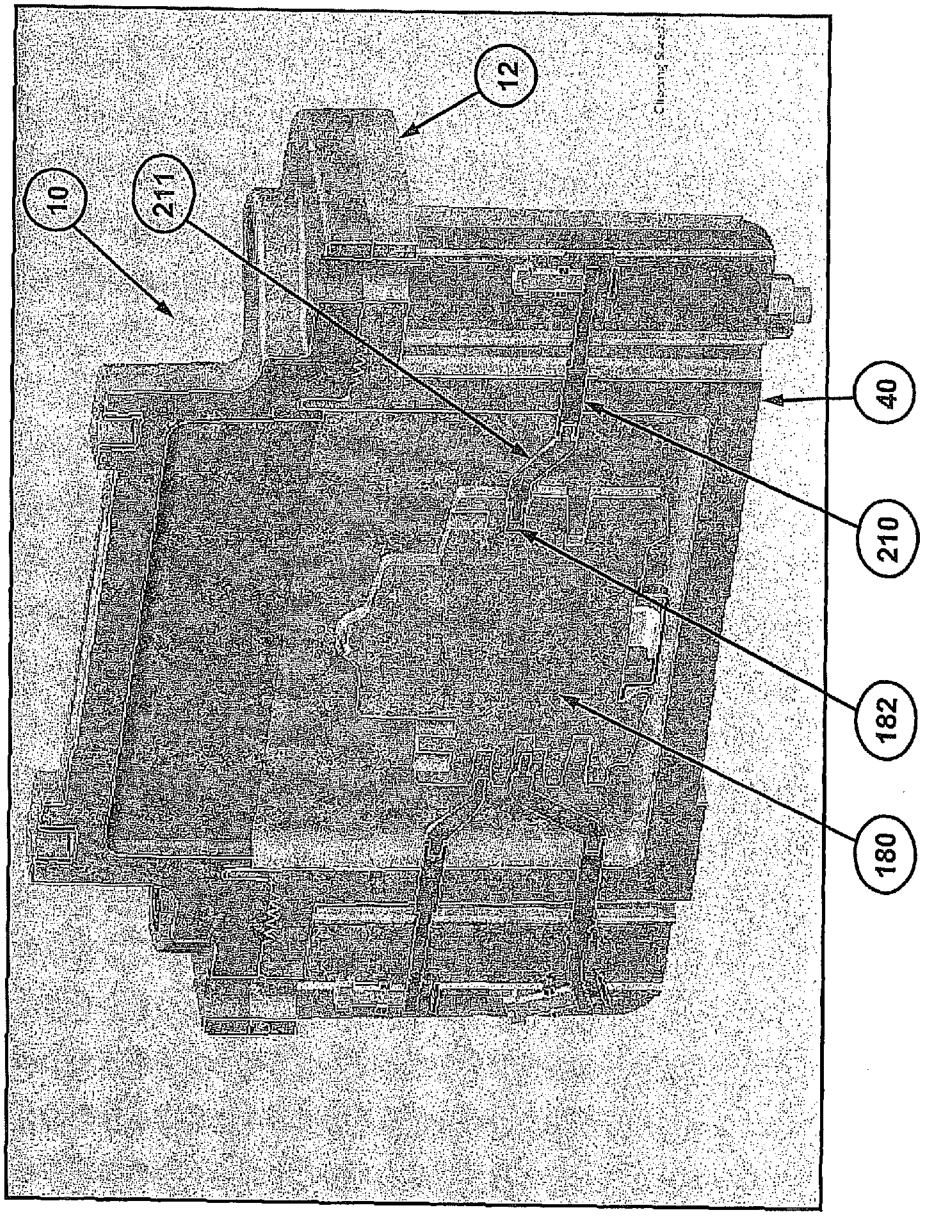
FIG. 20 is a cutaway view of the sealed electrical enclosure showing the positioning of the electrical bus through the sidewall and into engagement with the auxiliary contact positioned within the bottom housing.

FIG. 19 shows three electrical buses positioned on each side of the sealed enclosure. First end 202 of each electrical bus is shown with slots 204 in engagement with ridges 230 and 231 on ribs 42. Electrical bus 210 is also shown in proper engagement for connection to an auxiliary contact within the enclosure. FIG. 20 shows a cutaway view of sealed electrical enclosure 10 with electrical bus 210 extending through sidewall 40 of bottom housing 12 and having a first end 211 with a flexible wire inserted into contact port 182 of auxiliary contact 180.

Figure 21:
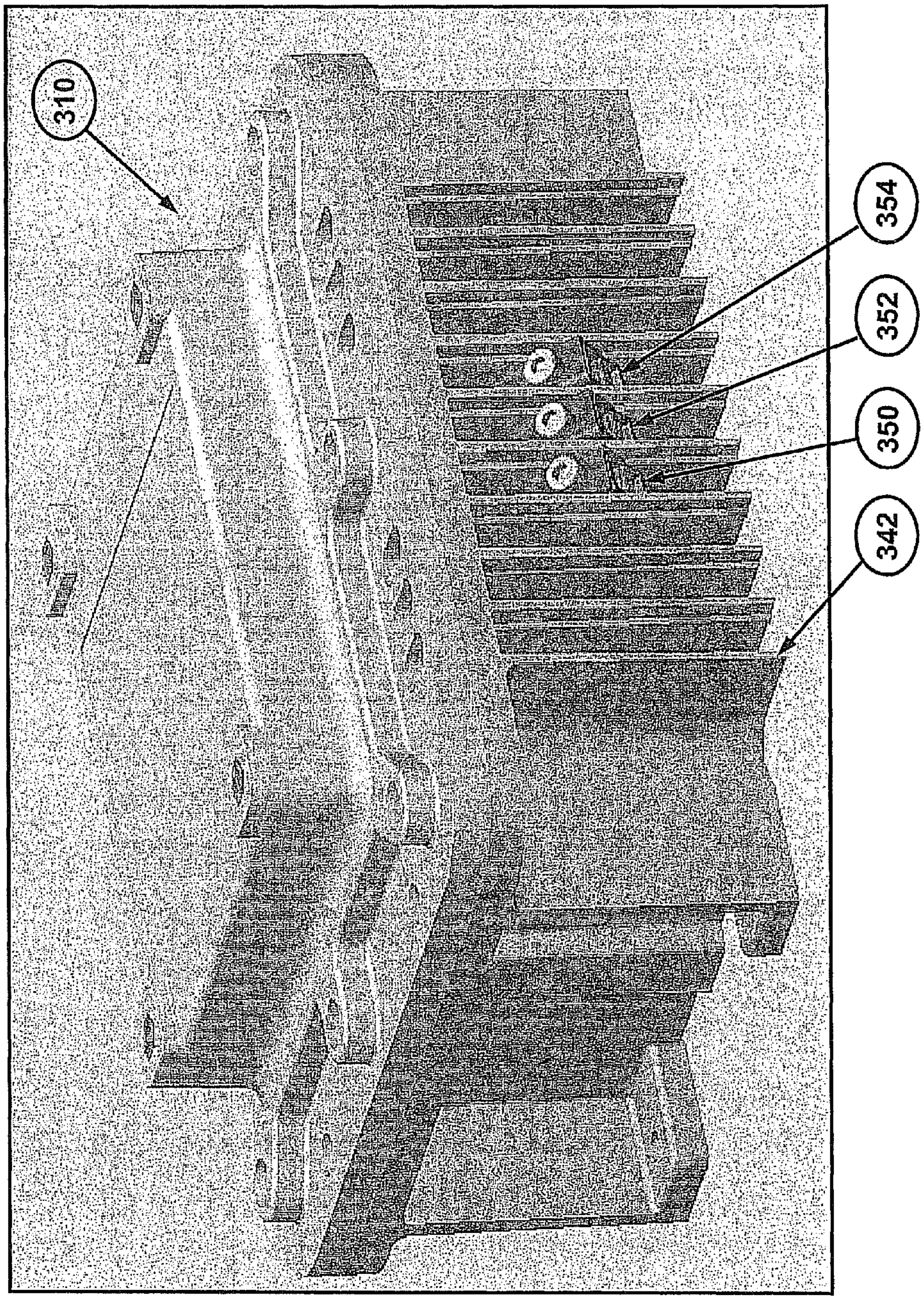
FIG. 21 is a perspective view of a nine-module embodiment of a sealed electrical enclosure.

In an alternate embodiment, a sealed enclosure 310 is shown in FIG. 21 in a 9 module design. In this embodiment, up to 9 different circuit breakers or electrical components could be positioned within the housing. As shown in FIG. 21, there are nine sets of vertical ribs 342 on the outer surface of the bottom housing of the enclosure. In FIG. 21, terminal assemblies 350, 352, and 354 are shown positioned between vertical ribs 342. Of course, other embodiments having even more (or less) modules could also be used. With the 9 module design, the following configurations of electrical components could be accommodated including four two pole breakers, three two pole breakers and three auxiliary contacts, three (pole+neutral) compact breakers and GFI and three auxiliary contacts, three three pole breakers, a two pole breaker and GFI, two four pole breakers, two three pole breakers and two auxiliary contacts, two compact four pole breakers and GFI with one auxiliary contact, or one three or four pole breaker and a GFI block of three modules, and an auxiliary contact.

The embodiments disclosed provide a flame proof enclosure for use in hazardous (classified) areas with the manipulation of the switch external to the enclosure. With such a design, the circuit breakers within the sealed electrical enclosure do not themselves need to be flame proof and can be more easily removed and replaced simply by removing top housing while allowing sealed electrical enclosure to be reused.

The present invention is shown in a particular configuration for illustrative purposes only. The sealed electrical enclosure may have varying geometries to accommodate various sized circuit breakers and electrical components. It is contemplated that the enclosure may be used with circuit breakers skus currently available from ABB. With some possible modification to the geometry of the housing, it is contemplated that the present design would be suitable for use for many different types of available or yet to be released circuit breakers.

It will be appreciated that the enclosure could be enlarged to house additional circuit breakers and its geometry could be modified to accommodate circuit breakers of varying size.

It is contemplated that embodiments of the sealed enclosure described herein may be used in hazardous (classified) locations such as IEC Zone 1 and Zone 2 environments, as well as Class I, Division 2 and Class I, Zone 1 environments.

While certain features and embodiments of the present application have been described in detail herein, it is to be understood that the application encompasses all modifications and enhancements within the scope and spirit of the following claims. Further, in method claims there is no requirement as to the order of the steps unless specifically stated.

We claim:

1. A sealed electrical enclosure for use in hazardous locations for enclosing circuit breakers or other electrical components comprising:

- a bottom housing having a first end wall and a second end wall opposite the first end wall;
- a top housing positioned above the bottom housing;
- a combination labyrinth joint and serrated joint being formed between the bottom housing and the top housing;
- the bottom housing adapted to receive a first circuit breaker and a first electrical component;
- a first machined aperture extending through the first end wall and positioned adjacent a first contact terminal of the first circuit breaker when the first circuit breaker is positioned within the bottom housing, the first aperture further including a first metal bus extending through the first aperture and in electrical contact with the first contact terminal and also extending to a point external to the bottom housing;
- a second machined aperture extending through the second end wall and positioned adjacent a second contact terminal of the first circuit breaker when the first circuit breaker is positioned within the bottom housing, the second aperture further including a second metal bus extending through the second aperture and in electrical contact with the second contact terminal and also extending to a point external to the bottom housing;
- a first actuating mechanism positioned on the top housing adapted for manipulating a switch of the first circuit breaker;
- and wherein the top housing is removably secured to the bottom housing to allow for removal and replacement of the first circuit breaker or the first electrical component within the housing.

2. The sealed electrical enclosure of claim 1, wherein the first actuating mechanism extends from the surface of the top housing a distance sufficient to allow for external actuation of the first actuating mechanism when the sealed electrical enclosure is positioned within an electrical panel.

3. The sealed electrical enclosure of claim 1, further including a third metal bus extending from a point internal to the bottom housing through the first end wall to a point external to the bottom housing;

- a fourth metal bus extending from a point internal to the bottom housing through the second end wall to a point external to the bottom housing;
- where the third metal bus and the fourth metal bus are adapted to contact the first and second electrical terminals of a second circuit breaker when placed within the bottom housing.

4. The sealed electrical enclosure of claim 3, where the third metal bus and the fourth metal bus include an end with a flexible wire.

5. The sealed electrical enclosure of claim 1, wherein the enclosure may be used in Class I Division 2 and Class I Zone 1 applications.

6. The sealed electrical enclosure of claim 1, wherein vertical ribs extend down at least a portion of the first end wall, and vertical ribs extend down at least a portion of the second end wall.

7. The sealed electrical enclosure of claim 6, wherein a first terminal assembly is positioned between ribs on the first end wall, and a second terminal assembly is positioned between ribs on the second end wall.

8. The sealed electrical enclosure of claim 6, wherein a first vertical ridge extends inwardly from one of the ribs on the first end wall and a second vertical ridge extends inwardly from an adjacent rib on the first end wall towards the first vertical ridge, and wherein a second end of the first metal bus includes a first slot that engages the first vertical ridge and a second slot that engages the second vertical ridge when the first metal bus is positioned through the first end wall.

9. The sealed electrical enclosure of claim 1, wherein the first metal bus extends through the first machined aperture drilled in the first end wall that is in alignment with the first electrical contact of the first circuit breaker, and the second metal bus extends through the second machined aperture drilled in the second end wall that is in alignment with the second electrical contact of the first circuit breaker.

10. The sealed electrical enclosure of claim 1, further including a third metal bus extending from a point internal to the bottom housing through the first end wall to a point external to the bottom housing;

- a fourth metal bus extending from a point internal to the bottom housing through the second end wall to a point external to the bottom housing;
- where the third metal bus and the fourth metal bus are adapted to contact the first and second electrical terminals of a second circuit breaker when placed within the bottom housing, and wherein
- the first metal bus extends through the first machined aperture drilled in the first end wall that is in alignment with the first electrical contact of the first circuit breaker, and the second metal bus extends through the second machined aperture drilled in the second end wall that is in alignment with the second electrical contact of the first circuit breaker, and the third metal bus extends through a third aperture drilled in the first end wall that is in alignment with the first electrical contact of a second circuit breaker, and the second metal bus extends through a fourth aperture drilled in the second end wall that is in alignment with the second electrical contact of the second circuit breaker.

11. A sealed electrical enclosure for use in hazardous locations for enclosing circuit breakers or other electrical components comprising:

- a bottom housing having a first end wall and a second end wall opposite the first end wall;
- a top housing positioned above the bottom housing;

a joint being formed between the bottom housing and the top housing;

the bottom housing adapted to receive a first circuit breaker and a first electrical component;

a first machined aperture extending through the first end wall and positioned adjacent a first contact terminal of the first circuit breaker when the first circuit breaker is positioned within the bottom housing, the first aperture further including a first contact terminal bus extending through the first aperture and in electrical contact with the first contact terminal and also extending to a point external to the bottom housing;

a second machined aperture extending through the second end wall and positioned adjacent a second contact terminal of the first circuit breaker when the first circuit breaker is positioned within the bottom housing, the second aperture further including a second contact terminal bus extending through the second aperture and in electrical contact with the second contact terminal and also extending to a point external to the bottom housing;

a first actuating mechanism positioned on the top housing adapted for manipulating a switch of the first circuit breaker;

and wherein the top housing is removably secured to the bottom housing to allow for removal and replacement of the first circuit breaker or the first electrical component within the housing.

12. The sealed electrical enclosure of claim 11, wherein a labyrinth joint is formed between the bottom housing and the top housing.

13. The sealed electrical enclosure of claim 11, wherein a serrated joint is formed between the bottom housing and the top housing.

14. The sealed electrical enclosure of claim 12, further including a third metal bus extending from a point internal to the bottom housing through the first end wall to a point external to the bottom housing;

a fourth metal bus extending from a point internal to the bottom housing through the second end wall to a point external to the bottom housing;

where the third metal bus and the fourth metal bus are adapted to contact the first and second electrical terminals of a second circuit breaker when placed within the bottom housing.

15. The sealed electrical enclosure of claim 13, further including a third metal bus extending from a point internal to the bottom housing through the first end wall to a point external to the bottom housing;

a fourth metal bus extending from a point internal to the bottom housing through the second end wall to a point external to the bottom housing;

where the third metal bus and the fourth metal bus are adapted to contact the first and second electrical terminals of a second circuit breaker when placed within the bottom housing.

16. The sealed electrical enclosure of claim 15, where the third metal bus and the fourth metal bus include an end with a flexible wire.

17. The sealed electrical enclosure of claim 11, wherein the enclosure may be used in Class I Division 2 and Class I Zone 1 applications.

18. The sealed electrical enclosure of claim 11, wherein vertical ribs extend down at least a portion of the first end wall, and vertical ribs extend down at least a portion of the second end wall.

19. The sealed electrical enclosure of claim 18, wherein a first terminal assembly is positioned between ribs on the first end wall, and a second terminal assembly is positioned between ribs on the second end wall.

20. The sealed electrical enclosure of claim 18, wherein a first vertical ridge extends inwardly from one of the ribs on the first end wall and a second vertical ridge extends inwardly from an adjacent rib on the first end wall towards the first vertical ridge, and wherein a second end of the first metal bus includes a first slot that engages the first vertical ridge and a second slot that engages the second vertical ridge when the first metal bus is positioned through the first end wall.

21. The sealed electrical enclosure of claim 11, wherein the first metal bus extends through a first aperture drilled in the first end wall that is in alignment with the first electrical contact of the first circuit breaker, and the second metal bus extends through a second aperture drilled in the second end wall that is in alignment with the second electrical contact of the first circuit breaker.

22. The sealed electrical enclosure of claim 11, further including a third metal bus extending from a point internal to the bottom housing through the first end wall to a point external to the bottom housing;

a fourth metal bus extending from a point internal to the bottom housing through the second end wall to a point external to the bottom housing;

where the third metal bus and the fourth metal bus are adapted to contact the first and second electrical terminals of a second circuit breaker when placed within the bottom housing, and wherein the first metal bus extends through the first aperture drilled in the first end wall that is in alignment with the first electrical contact of the first circuit breaker, and the second metal bus extends through the second aperture drilled in the second end wall that is in alignment with the second electrical contact of the first circuit breaker, and the third metal bus extends through a third aperture drilled in the first end wall that is in alignment with the first electrical contact of a second circuit breaker, and the second metal bus extends through a fourth aperture drilled in the second end wall that is in alignment with the second electrical contact of the second circuit breaker.

23. The sealed electrical enclosure of claim 11, further including a third metal bus extending from a point internal to the bottom housing through the first end wall to a point external to the bottom housing;

a fourth metal bus extending from a point internal to the bottom housing through the second end wall to a point external to the bottom housing;

where the third metal bus and the fourth metal bus are adapted to contact the first and second electrical terminals of an auxiliary contact when placed within the bottom housing.

24. The sealed electrical enclosure of claim 23, where the third metal bus and the fourth metal bus include an end with a flexible wire.

25. The sealed enclosure of claim 11, further including a third metal bus extending from a point internal to the bottom housing through the first end wall to a point external to the bottom housing;

a fourth metal bus extending from a point internal to the bottom housing through the second end wall to a point external to the bottom housing;

a fifth metal bus extending from a point internal to the bottom housing through the first end wall to a point external to the bottom housing:

a sixth metal bus extending from a point internal to the bottom housing through the second end wall to a point external to the bottom housing;

where the fifth metal bus and the sixth metal bus are adapted to contact the first and second electrical terminals of a third circuit breaker when placed within the bottom housing.

26. A method of positioning a circuit breaker or other electrical component within a sealed electrical enclosure comprising the steps of:

providing a bottom housing having a first end wall and a second end wall opposite the first end wall;

providing a top housing positioned above the bottom housing;

forming a serrated joint between the bottom housing and the top housing when the top housing is placed over the bottom housing;

positioning a first circuit breaker or electrical component in the bottom housing;

drilling a first aperture through the first end wall in a position adjacent to a first contact terminal of the first circuit breaker or electrical component;

positioning a first metal bus through the first aperture and into electrical contact with the first contact terminal;

drilling a second aperture through the second end wall in a position adjacent to a second contact terminal of the first circuit breaker or electrical component;

positioning a second metal bus through the second aperture and into electrical contact with the second contact terminal, wherein the first and second metal buses extend to a point external to the bottom housing to allow for further electrical connection, providing a first actuating mechanism positioned on the top housing adapted for manipulating a switch of the first circuit breaker, and securing the top housing to the bottom housing.

27. The method of claim 26 wherein the step of forming a serrated joint further includes the formation of a labyrinth joint when the top housing is placed over the bottom housing.

28. The method of claim 26 further including the steps of:

positioning a second circuit breaker or electrical component in the bottom housing;

drilling a third aperture through the first end wall in a position adjacent to a first contact terminal of the second circuit breaker or electrical component;

positioning a third metal bus through the third aperture and into electrical contact with the first contact terminal of the second circuit breaker or electrical component;

drilling a fourth aperture through the second end wall in a position adjacent to a second contact terminal of the second circuit breaker or electrical component;

positioning a fourth metal bus through the fourth aperture and into electrical contact with the second contact terminal of the second circuit breaker or electrical component, wherein the third and fourth metal buses extend to a point external to the bottom housing to allow for further electrical connection.

29. The method of claim 28 wherein the second circuit breaker or other electrical component comprises an auxiliary contact.

* * * * *